United States Patent
Bonneau et al.

(10) Patent No.: US 11,391,890 B1
(45) Date of Patent: Jul. 19, 2022

(54) MULTI-MODE SPIRAL DELAY DEVICE

(71) Applicants: PSIQUANTUM CORP., Palo Alto, CA (US); University of Bristol, Bristol (GB)

(72) Inventors: Damien Bonneau, Bristol (GB); Mark Thompson, Palo Alto, CA (US)

(73) Assignees: PSIQUANTUM CORP., Palo Alto, CA (US); University of Bristol, Bristol (GB)

(*) Notice: Subject to any disclaimer, the term of this patent is extended or adjusted under 35 U.S.C. 154(b) by 0 days.

(21) Appl. No.: 16/875,372

(22) Filed: May 15, 2020

Related U.S. Application Data

(60) Provisional application No. 62/848,473, filed on May 15, 2019.

(51) Int. Cl.
  *G02B 6/26* (2006.01)
  *G02B 6/28* (2006.01)
  *H01P 9/00* (2006.01)

(52) U.S. Cl.
  CPC .......... *G02B 6/2861* (2013.01); *G02B 6/262* (2013.01); *H01P 9/00* (2013.01)

(58) Field of Classification Search
  None
  See application file for complete search history.

(56) References Cited

U.S. PATENT DOCUMENTS

| | | | |
|---|---|---|---|
| 5,159,699 A | 10/1992 | de Monts | |
| 6,122,416 A | 9/2000 | Ooba et al. | |
| 6,385,376 B1 | 5/2002 | Bowers et al. | |
| 6,724,968 B2 | 4/2004 | Lackritz et al. | |
| 7,095,920 B1 | 8/2006 | Little | |
| 7,289,698 B2* | 10/2007 | Deliwala | G02B 6/1228 385/28 |
| 8,189,972 B2 | 5/2012 | Little | |
| 2008/0044126 A1 | 2/2008 | Costa et al. | |

(Continued)

FOREIGN PATENT DOCUMENTS

| | | |
|---|---|---|
| EP | 0532014 B1 | 1/1998 |
| JP | 05307124 A | 11/1993 |

(Continued)

OTHER PUBLICATIONS

Thompson, Non-Final Office Action, U.S. Appl. No. 16/693,163, dated Feb. 18, 2021, 19 pgs.

(Continued)

*Primary Examiner* — Chad H Smith
(74) *Attorney, Agent, or Firm* — Morgan, Lewis & Bockius LLP

(57) ABSTRACT

An optical device includes a first multi-mode waveguide, a first optical coupler coupled to the first multi-mode waveguide, the first coupler being tapered and curved, and a first single-mode waveguide having a first end coupled to the first optical coupler. The optical device maybe used in an optical delay device. A method of propagating light in a first multi-mode waveguide toward a first optical coupler, propagating the light in the first optical coupler toward a first single-mode waveguide, the first optical coupler being tapered and curved, and propagating the light along the first single-mode waveguide is also disclosed.

19 Claims, 15 Drawing Sheets

(56) References Cited

U.S. PATENT DOCUMENTS

| | | | | |
|---|---|---|---|---|
| 2012/0219026 A1* | 8/2012 | Saracco | ............ | H01S 3/06754 372/21 |
| 2012/0330625 A1* | 12/2012 | Bagheri | ................ | G02B 6/125 703/1 |
| 2015/0188659 A1 | 7/2015 | Lipson et al. | | |

FOREIGN PATENT DOCUMENTS

| | | | | |
|---|---|---|---|---|
| JP | 05333221 A | 12/1993 | | |
| JP | 2000321454 A | 11/2000 | | |
| WO | WO 2019/005826 A1 | 1/2019 | | |
| WO | WO-2019038477 A1 * | 2/2019 | ............ | G02B 6/126 |

OTHER PUBLICATIONS

Okuno et al., Machine Translation of JP 2000-321454 A, Nov. 24, 2000, 27 pgs.

Li, Ultralow-Loss, High Density SOI Optical Waveguide Routing for Macrochip Interconnects, May 11, 2012, 5 pgs.

Bamiedakis, Cost Effective Polymer Multimode Directional Couplers for High-Speed on Board Optical Interconnects, Jun. 11-13, 2008, 4 pgs.

Lagali, University of Alberta, The Generalized Mach-Zehnder Interferometer Using Multimode Interference Couplers for Optical Communications Networks, 2000, 155 pgs.

Gundavarapu, Integrated Sagnac Optical Gyroscope Sensor Using Ultra-Low Loss High Aspect Ratio Silicon Nitride Waveguide Coil, 2017, 4 pgs.

Lee, Ultra-Low-Loss Optical Delay Line on a Silicon Chip, May 29, 2012, 7 pgs.

Tran, Ultra-Low-Loss Silicon Waveguides for Heteroeneously Integrated Silicon/III-V Photonics, Jul. 13, 2018, 13 pgs.

Sacher, Monolithically Integrated Multilayer Silicon Nitride-on Silicon Waveguide Platforms for 3-D Photonic Circuits and Devices, Proceedings of the IEEE, vol. 106, No. 12, Dec. 2018, 14 pgs.

Mohanty, Nature Communications, Quantum Interference Between Transcerse Spatial Waveguide Modes, Jan. 20, 2017, 7 pgs.

Yang, Silicon Nitride Three-Mode Division Multiplexing and Wavelength-Division Multiplexing Using Asymetrical Directional Couplers and Microring Resonators, Sep. 8, 2014, 12 pgs.

Fu, Efficient Adiabatic Silicon-on Insulator Waveguide Taper, vol. 2, No. 3, Jun. 2014, 4 pgs.

Thompson, Non-Final Office Action, U.S. Appl. No. 16/693,163, dated Oct. 16, 2020, 7 pgs.

Thompson, Non-Final Office Action, U.S. Appl. No. 16/741,646, dated Jan. 27, 2021, 16 pgs.

"Resonance-Free Light Recycling in Waveguides" by Chang et al., Conference of Laser and Electro-Optics (CLEO) 2017, paper SF1J. 5, (Year:2017).

"WDM-Compatible Mode Division Multiplexing on a Silicon Chip" by Luo et al., Nature Communications, 5:3069, pp. 1-7, (Year:2014).

"On-Chip Silicon 8-Channel Hybrid (de)Multiplexer Enabling Simultaneous Mode- and Polarization-Division-Multiplexing" by Wang et al., Laser Photonics Rev. 8, No. 2, L18-L-22, (Year:2014).

Thompson, Final Office Action, U.S. Appl. No. 16/741,646, dated Oct. 22, 2021, 19 pgs.

* cited by examiner

340

342 — The second light path includes a third plurality of spiral rounds, corresponding to the second coupler, that has a third inmost spiral portion that has a fifth radius of curvature and a third outmost spiral portion that has a sixth radius of curvature that is larger than the fifth radius of curvature such that spiral portions between the third inmost spiral portion and the third outmost spiral portion have successively increasing radii between the fifth radius of curvature and the sixth radius of curvature; and a fourth plurality of spiral rounds corresponding to the second multi-mode waveguide, that has a fourth inmost spiral portion that has a seventh radius of curvature that is smaller than the sixth radius of curvature and a fourth outmost spiral portion that has a eighth radius of curvature that is larger than the seventh radius of curvature such that spiral portions between the fourth inmost spiral portion and the fourth outmost spiral portion have successively increasing radii between the seventh radius of curvature and the eighth radius of curvature 342-1 — The third plurality of spiral rounds has a third number of spiral rounds that corresponds to the second number of spiral rounds and the fourth plurality of spiral rounds has a fourth number of spiral rounds that corresponds to the first number of spiral rounds 342-2 — The eighth radius of curvature is substantially equal to the first radius of curvature, the seventh radius of curvature is substantially equal to the second radius of curvature, the sixth radius of curvature is substantially equal to the third radius of curvature, and the fifth radius of curvature is substantially equal to the fourth radius of curvature 344 — Propagate the light along the second coupler without evanescently coupling the light into the first coupler and propagate the light along the second multi-mode waveguide without evanescently coupling the light into the first multi-mode waveguide

Figure 3C

MULTI-MODE SPIRAL DELAY DEVICE

RELATED APPLICATIONS

This application claims the benefit of, and priority to, U.S. Provisional Application No. 62/848,473, filed May 15, 2019, entitled "Multi-Mode Spiral Delay Device," which is incorporated by reference herein in its entirety.

TECHNICAL FIELD

This relates generally to photonic devices and, more specifically, to optical delay devices.

BACKGROUND

Optical waveguides (or waveguides) are widely used for transmitting light. For example, optical fibers are used in various telecommunication systems. Slab or planar waveguides are used in photonic devices for manipulating light (such as directing light, coupling light, filtering light, generating light output, etc.).

Optical delay devices used in various optical applications, such as time-resolved spectroscopy, interferometry, and time divisional optical communications often include optical waveguides. In order to provide a sufficient delay, optical delay devices would include long optical waveguides, which increase the overall size of the optical delay devices. Accordingly, there is a need for an optical delay device having a compact size.

SUMMARY

One or more embodiments of the present disclosure provide an optical delay device that includes a first multi-mode waveguide spiraling inward toward a center region of the optical delay device, and a first coupler that is coupled to the first multi-mode waveguide and configured to receive light from the first multi-mode waveguide. The first coupler spirals further inward towards a center region of the optical delay device. The optical delay device also includes a first single-mode waveguide that is located in the center region and configured to receive light from the first coupler, and a second coupler configured to receive light from the first single-mode waveguide, the second coupler spiraling outward from the center region. The optical device further includes a second multi-mode waveguide that is coupled to the second coupler and configured to receive light from the second coupler. The second coupler spirals further outward from the center region. A first end of the first single-mode waveguide is coupled to the first coupler and a second end of the first single-mode waveguide, opposite to the first end, is coupled to the second coupler.

In some embodiments, the first multi-mode waveguide includes a first plurality of spiral rounds. The first plurality of spiral rounds includes a first outmost spiral portion that has a first radius of curvature and a first inmost spiral portion that has a second radius of curvature that is smaller than the first radius of curvature. Spiral portions between the first outmost spiral portion and the first inmost spiral portion have successively decreasing radii from the first radius of curvature to the second radius of curvature. The first coupler includes a second plurality of spiral rounds. The second plurality of spiral rounds includes a second outmost spiral portion that has a third radius of curvature and a second inmost spiral portion that has a fourth radius of curvature that is smaller than the third radius of curvature. Spiral portions between the second outmost spiral portion and the second inmost spiral portion have successively decreasing radii from the third radius of curvature to the fourth radius of curvature. The second coupler includes a third plurality of spiral rounds. The third plurality of spiral rounds includes a third inmost spiral portion that has a fifth radius of curvature and a third outmost spiral portion that has a sixth radius of curvature that is larger than the fifth radius of curvature. Spiral portions between the third inmost spiral portion and the third outmost spiral portion have successively increasing radii from the fifth radius of curvature to the sixth radius of curvature. The second multi-mode waveguide includes a fourth plurality of spiral rounds. The fourth plurality of spiral rounds includes a fourth inmost spiral portion that has a seventh radius of curvature and a fourth outmost spiral portion that has an eighth radius of curvature that is larger than the seventh radius of curvature. Spiral portions between the fourth inmost spiral portion and the fourth outmost spiral portion have successively increasing radii between the seventh radius of curvature and the eighth radius of curvature.

In some embodiments, the first single-mode waveguide includes a curved portion having a radius of curvature that is smaller than each of the fourth radius of curvature and the fifth radius of curvature.

In some embodiments, the first plurality of spiral rounds is interleaved with the fourth plurality of spiral rounds and the second plurality of spiral rounds is interleaved with the third plurality of spiral rounds. Any portion of the first plurality of spiral rounds is separated from any adjacent portion of the fourth plurality of spiral rounds for preventing light propagating in the first plurality of spiral rounds from being evanescently coupled into the fourth plurality of spiral rounds. Any portion of the second plurality of spiral rounds is separated from any adjacent portion of the third plurality of spiral rounds for preventing light propagating in the second plurality of spiral rounds from being evanescently coupled into the third plurality of spiral rounds.

In some embodiments, the first plurality of spiral rounds has a first number of spiral rounds, the second plurality of spiral rounds has a second number of spiral rounds, the third plurality of spiral rounds has a third number of spiral rounds that corresponds to the second number of spiral rounds, and the fourth plurality of spiral rounds has a fourth number of spiral rounds that corresponds to the first number of spiral rounds.

In some embodiments, the optical delay device includes at least 10 spiral rounds (e.g., a total number of spiral rounds in the first plurality of spiral rounds, the second plurality of spiral rounds, the third plurality of spiral rounds, and the fourth plurality of spiral rounds is at least 10). In some embodiments, the optical delay device includes at least 100 spiral rounds (e.g., the total number of spiral rounds in the first plurality of spiral rounds, the second plurality of spiral rounds, the third plurality of spiral rounds, and the fourth plurality of spiral rounds is at least 100).

In some embodiments, the eighth radius of curvature is substantially equal to the first radius of curvature, the seventh radius of curvature is substantially equal to the second radius of curvature, the sixth radius of curvature is substantially equal the third radius of curvature, the fifth radius of curvature is substantially equal the fourth radius of curvature, the third radius of curvature is substantially equal to the second radius of curvature, and the seventh radius of curvature is substantially equal to the sixth radius of curvature.

In some embodiments, the first plurality of spiral rounds, the second plurality of spiral rounds, the third plurality of spiral rounds, and the fourth plurality of spiral rounds are concentric spiral rounds.

In some embodiments, the optical delay device also includes an input coupler that is adiabatically coupled to the first multi-mode waveguide and an output coupler that is adiabatically coupled to the second multi-mode waveguide. The first multi-mode waveguide is configured to receive light from the input coupler and propagate the light toward to first coupler. The second multi-mode waveguide is configured to propagate light received from the second coupler toward the output coupler.

In some embodiments, the input coupler includes a portion having the first radius of curvature and the output coupler includes a portion having the eighth radius of curvature.

In some embodiments, the first multi-mode waveguide has a first width, the second multi-mode waveguide has a second width, and the first single-mode waveguide has a third width that is smaller than each of the first width and the second width. The first coupler has a width that tapers from the first width to the third width and the second coupler has a width that tapers from the second width to the third width.

In some embodiments, the first multi-mode waveguide has a first length, the second multi-mode waveguide has a second length, and the first single-mode waveguide has a third length; that is smaller than each of the first length and the second length.

In some embodiments, the first multi-mode waveguide, the second multi-mode waveguide, the first single-mode waveguide, the first coupler, and the second coupler are formed in a same layer of a material on a substrate.

One or more embodiments of the present disclosure provide a method of propagating light, the method includes receiving light, propagating the light in a first multi-mode waveguide toward a first coupler, and propagating the light in the first coupler toward a first single-mode waveguide such that the first multi-mode waveguide and the first coupler provide a first light path that spirals inward toward a center region. The method also includes propagating the light along the first single-mode waveguide toward a second coupler, propagating the light in the second coupler toward a second multi-mode waveguide, propagating the light in the second multi-mode waveguide, and outputting the light. The second coupler and the second multi-mode waveguide provide a second light path that spirals outward from the center region. The first single-mode waveguide provides a third light path through the center region and between the first light path and the second light path.

In some embodiments, the first light path includes a first plurality of spiral rounds corresponding to the first multi-mode waveguide. The first plurality of spiral rounds includes a first outmost spiral portion that has a first radius of curvature and a first inmost spiral portion that has a second radius of curvature that is smaller than the first radius of curvature. Spiral portions between the first outmost spiral portion and the first inmost spiral portion have successively decreasing radii from the first radius of curvature to the second radius of curvature. The first light path also includes a second plurality of spiral rounds corresponding to the first coupler. The second plurality of spiral rounds includes a second outmost spiral portion that has a third radius of curvature and a second inmost spiral portion that has a fourth radius of curvature that is smaller than the third radius of curvature. Spiral portions between the second outmost spiral portion and the second inmost spiral portion have successively decreasing radii from the third radius of curvature to the fourth radius of curvature. The second light path includes a third plurality of spiral rounds corresponding to the second coupler. The third plurality of spiral rounds includes a third inmost spiral portion that has a fifth radius of curvature and a third outmost spiral portion that has a sixth radius of curvature that is larger than the fifth radius of curvature. Spiral portions between the third inmost spiral portion and the third outmost spiral portion have successively increasing radii from the fifth radius of curvature to the sixth radius of curvature. The second light path further includes a fourth plurality of spiral rounds corresponding to the second multi-mode waveguide. The fourth plurality of spiral rounds includes a fourth inmost spiral portion that has a seventh radius of curvature and a fourth outmost spiral portion that has an eighth radius of curvature that is larger than the seventh radius of curvature. Spiral portions between the fourth inmost spiral portion and the fourth outmost spiral portion have successively increasing radii from the seventh radius of curvature to the eighth radius of curvature.

In some embodiments, propagating the light along the first single-mode waveguide includes propagating the light along a curved path having a radius of curvature that is smaller than each of the fourth radius of curvature and the fifth radius of curvature.

In some embodiments, the first plurality of spiral rounds has a first number of spiral rounds, the second plurality of spiral rounds has a second number of spiral rounds, the third plurality of spiral rounds has a third number of spiral rounds that corresponds to the second number of spiral rounds, and the fourth plurality of spiral rounds has a fourth number of spiral rounds that corresponds to the first number of spiral rounds.

In some embodiments, receiving the light includes propagating the light along an input single-mode waveguide toward an input coupler and propagating the light along the input coupler toward the first multi-mode waveguide. In some embodiments, outputting the light includes coupling the light from the second multi-mode waveguide, through an output coupler, to an output single-mode waveguide and propagating the light along the output single-mode waveguide.

In some embodiments, propagating the light along the input coupler includes propagating the light along a path that has the first radius of curvature. In some embodiments, coupling the light from the second multi-mode waveguide, through the output coupler, to the output single-mode waveguide includes propagating the light along a path having the eighth radius of curvature.

In some embodiments, propagating the light in the first multi-mode waveguide also includes propagating the light along the first multi-mode waveguide without evanescently coupling the light into the second multi-mode waveguide, propagating the light in the first coupler includes propagating the light along the first coupler without evanescently coupling the light into the second coupler, propagating the light in the second coupler also includes propagating the light along the second coupler without evanescently coupling the light into the first coupler, and propagating the light in the second multi-mode waveguide includes propagating the light along the second multi-mode waveguide without evanescently coupling the light into the first multi-mode waveguide.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIGS. 3A-3C are flowcharts illustrating a method of propagating light to create an optical delay in accordance with some embodiments.

Like reference numerals refer to corresponding parts throughout the several views of the drawings. The drawings may not be drawn to scale unless stated otherwise.

DETAILED DESCRIPTION

As explained above, there is a need for an optical delay device (or photonic delay line) that is compact. The disclosed optical delay devices and methods described herein meet the need by allowing transmission of light in a spiral optical path with a small footprint on a substrate. A majority of the delay path of the optical delay devices include multi-mode waveguides, resulting in reduced optical loss as light propagates along the optical delay device.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first waveguide could be termed a second waveguide, and, similarly, a second waveguide could be termed a first waveguide, without departing from the scope of the various described embodiments. The first waveguide and the second waveguide are both waveguides, but they are not the same waveguide.

Figure 1A:
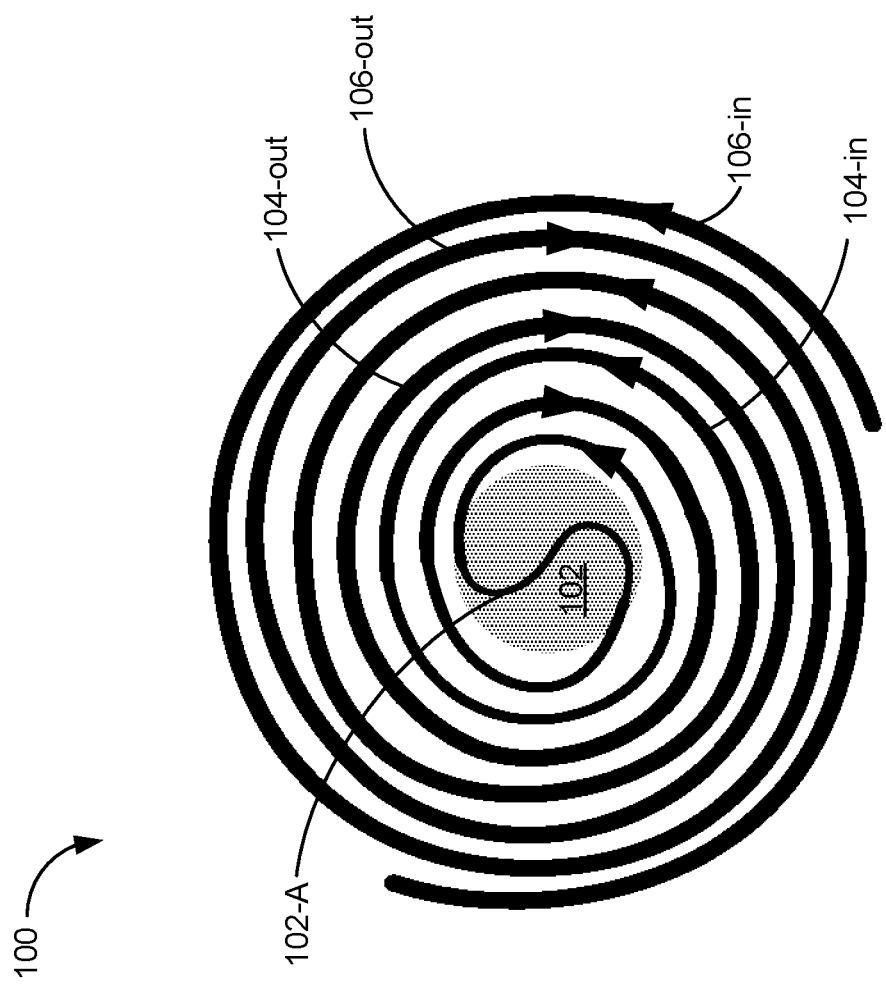
FIG. 1A is a simplified diagram illustrating an optical delay device and an optical path of light propagating through different portions of the optical delay device in accordance with some embodiments.

FIG. 1A is a simplified diagram illustrating an optical delay device 100 and an optical path of light propagating in the optical delay device in accordance with some embodiments. As shown, optical delay device 100 includes a first multi-mode waveguide 106-in providing a first portion of the optical path that spirals inward toward a center region 102 of optical delay device 100. First multi-mode waveguide 106-in is coupled (e.g., physically, optically) to a first coupler 104-in, which provides a second portion of the optical path that spirals further inward toward center region 102 of optical delay device 100. Optical delay device 100 further includes a first single-mode waveguide 102-A disposed (e.g., located) in center region 102 and providing a third portion of the optical path through the center region. Optical delay device 100 also includes a second coupler 104-out providing a fourth portion of the optical path that spirals outward from center region 102. Second coupler 104-out is coupled (e.g., physically, optically) to a second multi-mode waveguide 106-out, which provides a fifth portion of the optical path that spirals further outward from center region 102. First single-mode waveguide 102-A has a first end and a second end that is opposite to the first end. The first end of first single-mode waveguide 102-A is coupled (e.g., physically, optically) to first coupler 104-in and the second end of first single-mode waveguide 102-A is coupled (e.g., physically, optically) to second coupler 104-out. Lines with upward pointing arrows correspond to waveguides that spiral inward towards center region 102 (e.g., first multi-mode waveguide 106-in and first coupler 104-in) and lines with downward pointing arrows correspond to waveguides that spiral outwards from center region 102 (e.g., second multi-mode waveguide 106-out and second coupler 104-out).

First single-mode waveguide 102-A is configured to allow propagation of light in a fundamental optical mode (e.g., $TE_0$). For example, first single-mode waveguide may have a width of 1 micrometer or less. Typically, propagation of light in higher order modes (e.g., optical modes that are not the fundamental optical mode, such as $TE_1$, $TE_2$, etc.) is prohibited in single-mode waveguides. In contrast, multi-mode waveguide 106-in or 106-out is configured to allow light to propagate, along the multi-mode waveguide, in one or more of a plurality of modes including the fundamental optical mode and higher order modes (e.g., light in a higher order mode as well as light in the fundamental optical mode can propagate through the multi-mode waveguide). For example, multi-mode waveguide 106-in or 106-out may have a width that is greater than 1 micrometer. In general, for propagation of light having a particular wavelength, a single-mode waveguide has a smaller width compared to a multi-mode waveguide.

First multi-mode waveguide 106-in is configured to receive light, and to propagate the light along an inward spiral toward first coupler 104-in. First coupler 104-in is configured to receive the light from the first multi-mode waveguide, and to adiabatically couple the light to first single-mode waveguide 102-A, which is configured to transmit the light toward second coupler 104-out while changing the propagation direction of the light. Second coupler is configured to receive the light from first single-mode waveguide and to adiabatically couple the light to second multi-mode waveguide 106-out, which is configured to propagate the light along an outward spiral to an output of optical delay device 100. Arrows shown along the waveguides of optical delay device 100 indicate the optical path (e.g., propagation direction, travel direction) of light in optical delay device 100.

Figure 1B:
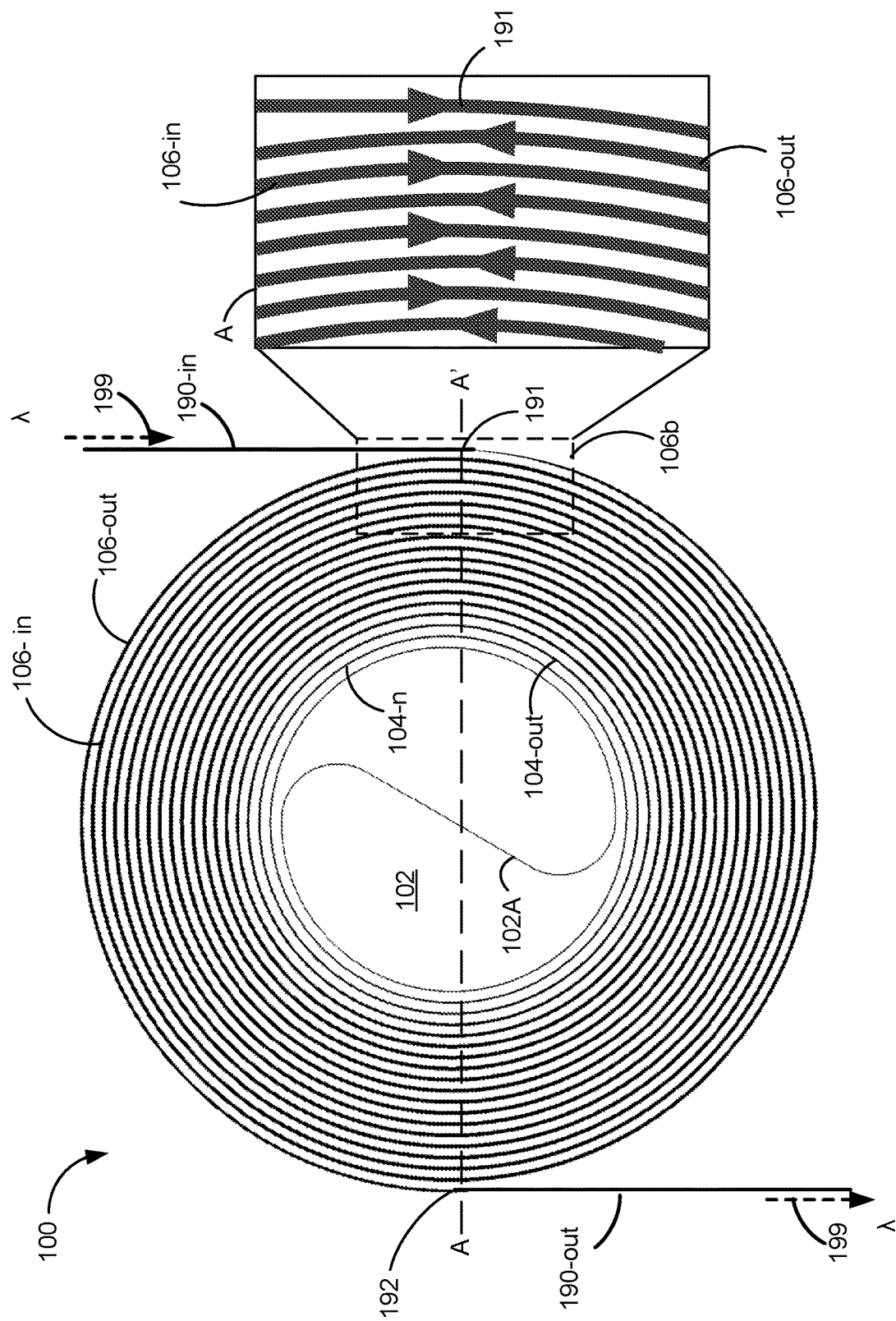
FIGS. 1B-1D are plan views of an optical delay device in accordance with some embodiments.
Figure 1C:
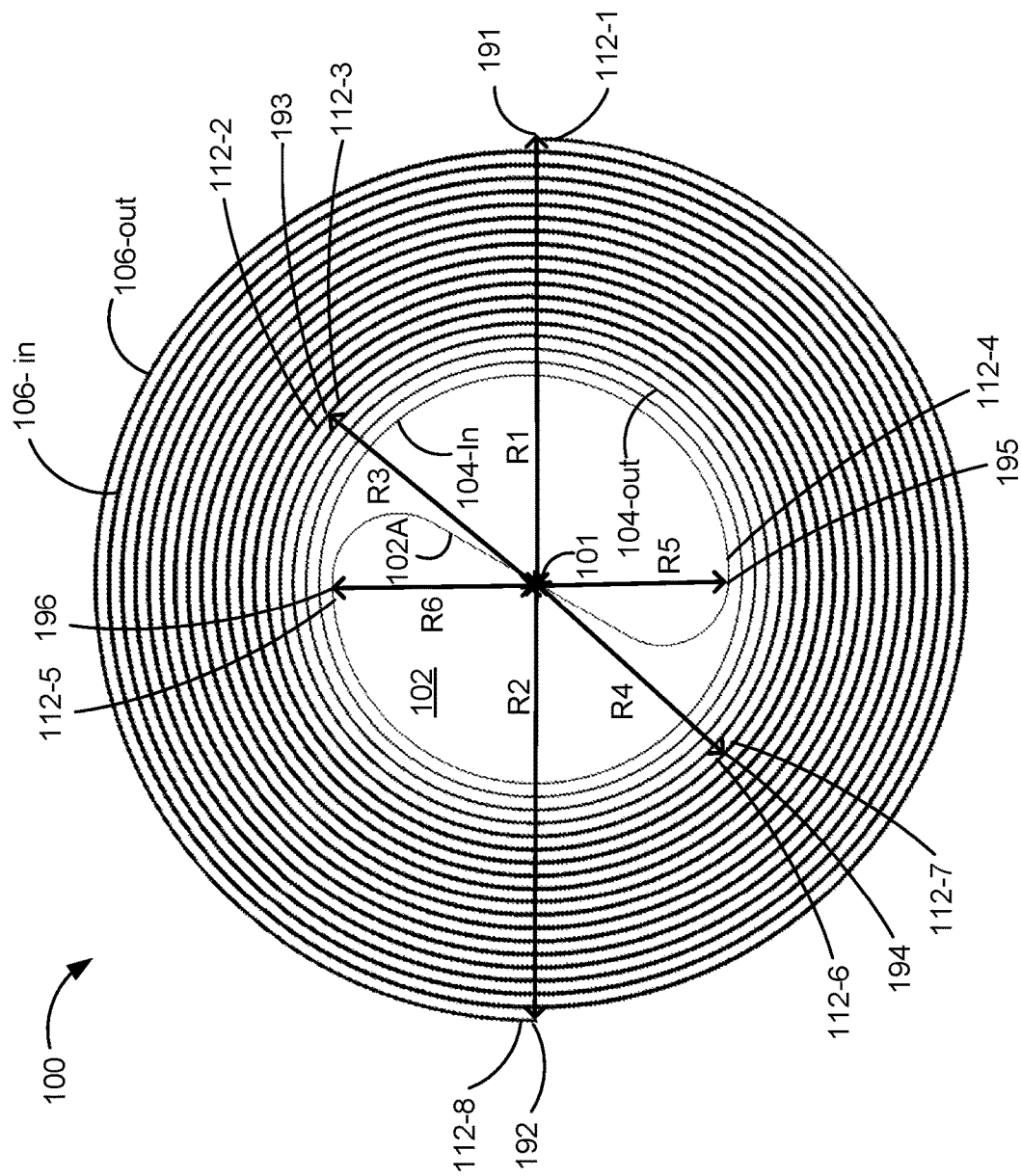
Figure 1D:
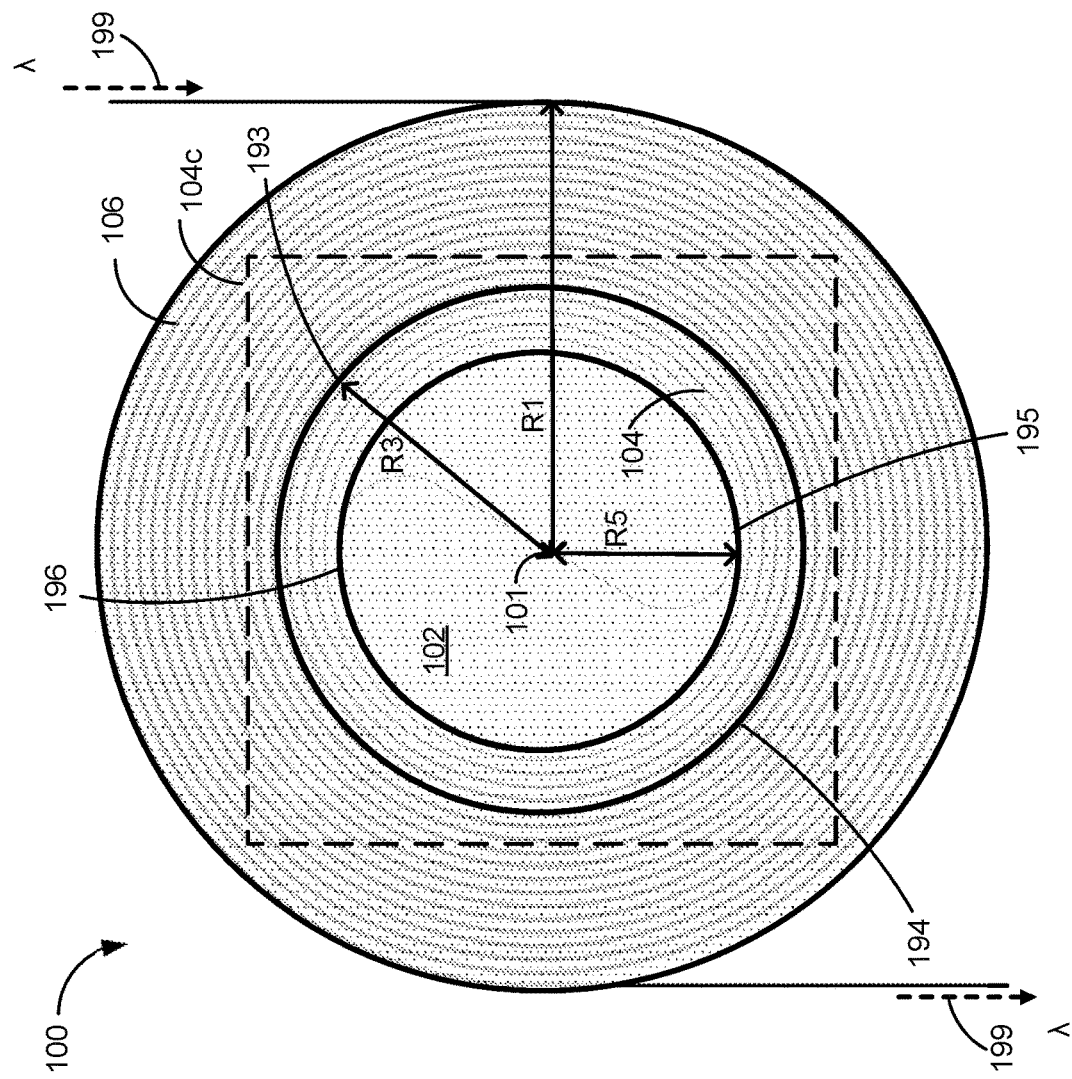

FIGS. 1B-1D are plan views of optical delay device 100 in accordance with some embodiments. As shown in FIG. 1B, first multi-mode waveguide 106-in can be coupled to an input multi-mode waveguide 190-in at an input 191 of optical delay device 100, and second multi-mode waveguide 106-out can be coupled to an output multi-mode waveguide 190-out at an output 192 of optical delay device 100. As shown, optical delay device 100 is configured to receive light 199 at input 191 and to propagate light 199 through first multi-mode waveguide 106-in and first coupler 104-in in inward spirals toward center region 102, through first single-mode waveguide 102-A in the center region, and then through second coupler 104-out and second multi-mode waveguide 106-out in outward spirals toward output 192. FIG. 1B also shows inset A, which is a zoomed-in view of a portion 106b of a second annular region 106 near input 191. Lines with downward pointing arrows correspond to first multi-mode waveguide 106-in and lines with upward pointing arrows correspond to second multi-mode waveguide 106-out.

FIG. 1C shows input 191 having a distance R1 from a center 101 of optical delay device 100, and output 192 having a distance R2 from center 101 of optical delay device 100. In some embodiments, R2 is equal to R1 (or differing by less than 1%). FIG. 1C also indicates a junction 193, at which the inward spirals of optical delay device 100 transition from first multi-mode waveguide 106-in to first coupler 104-in, or at which first multi-mode waveguide 106-in is coupled to first coupler 104-in. Junction 193 has a distance R3 from center 101. FIG. 1C also indicates a junction 194, at which the outward spirals of optical delay device 100 transition from second coupler 104-out to second multi-mode waveguide 106-out, or at which second multi-mode waveguide 106-out is coupled to second coupler 104-out. Junction 194 has a distance R4 from center 101. In some embodiments, R4 is equal to R3 (or differing by less than 1%). FIG. 1C also indicates a junction 195, at which the inward spirals of optical delay device 100 transition from first coupler 104-in to first single-mode waveguide 102-A, or at which first coupler 104-in is coupled to first single-mode waveguide 102-A. Junction 195 has a distance R5 from center 101. FIG. 1C also indicates a junction 196, at which the outward spirals of optical delay device 100 transition from first single-mode waveguide 102-A to second coupler 104-out, or at which second coupler 104-out is coupled to first single-mode waveguide 102-A. Junction 196 has a distance R6 from center 101. In some embodiments, R6 is equal to R5 (or differing by less than 1%).

As shown in FIG. 1C, first multi-mode waveguide 106-in includes a first plurality of spiral rounds located between a first outmost spiral portion 112-1 and a first inmost spiral portion 112-2 of first multi-mode waveguide 106-in (e.g., spiral rounds located in second annular region 106 and corresponding to first multi-mode waveguide 106-in). The first outmost spiral portion 112-1 has a first radius of curvature that corresponds to distance R1. The first inmost spiral portion 112-2 has a second radius of curvature that corresponds to distance R3 and is smaller than the first radius of curvature. Spiral portions that are located between the first outmost spiral portion 112-1 and the first inmost spiral portion 112-2 have successively decreasing radii that decrease continuously and monotonously from R1 to R3.

Figure 1E:
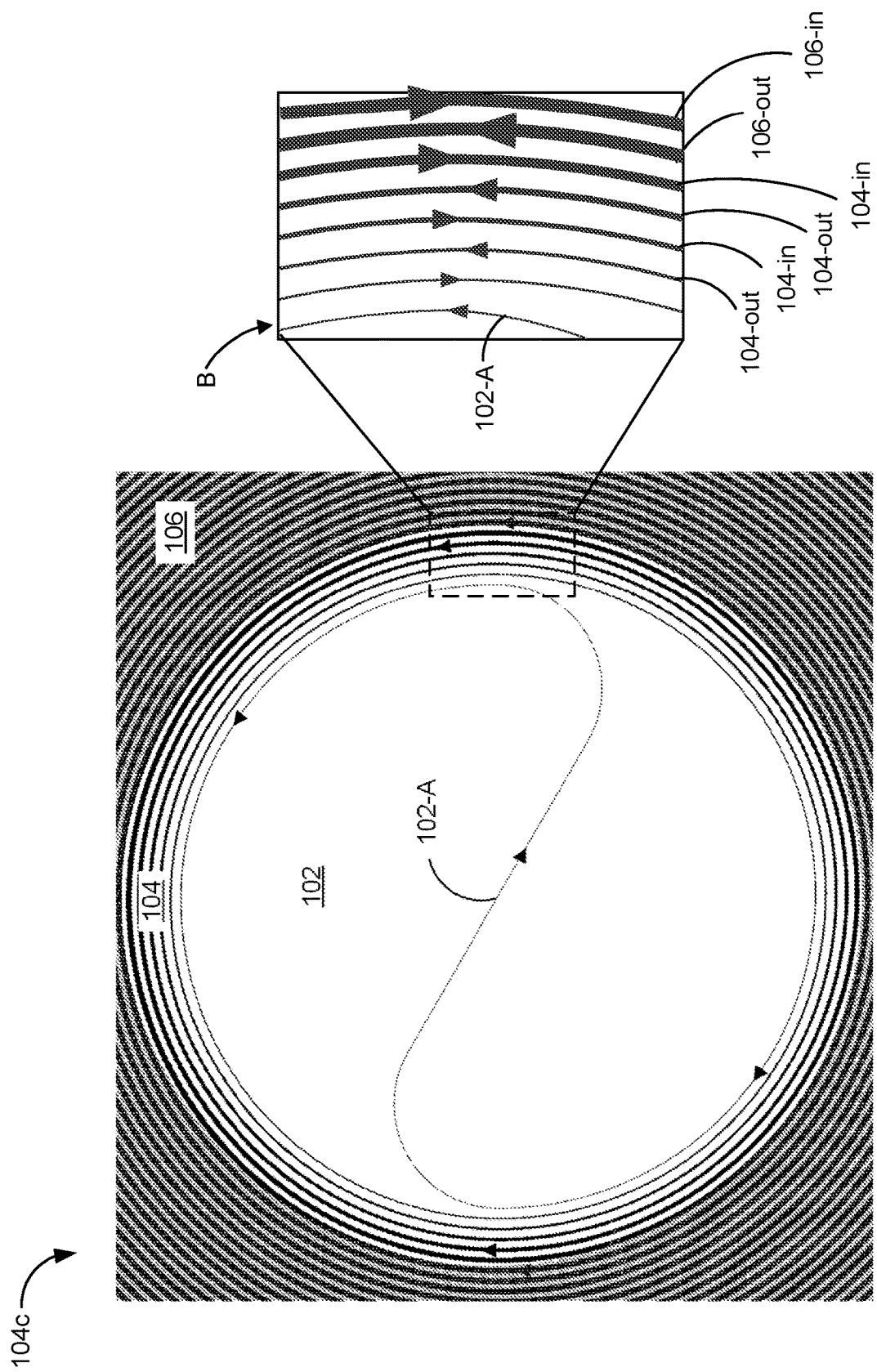
FIG. 1E is a partial plan view of an optical delay device illustrating a center region of the optical device shown in FIGS. 1A-1D in accordance with some embodiments.

As shown in FIG. 1C, first coupler 104-in includes a second plurality of spiral rounds located between a second outmost spiral portion 112-3 and a second inmost spiral portion 112-4 of first coupler 104-in (e.g., spiral rounds located in first annular region 104, shown in inset B of FIG. 1E as spiral rounds with decreasing widths). The second outmost spiral portion 112-3 has a third radius of curvature that corresponds to distance R3. The second inmost spiral portion 112-4 has a fourth radius of curvature that corresponds to distance R5 and is smaller than the third radius of curvature. Spiral portions that are located between the second outmost spiral portion 112-3 and the second inmost spiral portion 112-4 have successively decreasing radii that decrease continuously and monotonously from R3 to R5. In some embodiments, the second radius of curvature and the third radius of curvature both correspond to distance R3.

As shown in FIG. 1C, second coupler 104-out includes a third plurality of spiral rounds located between a third inmost spiral portion 112-5 and a third outmost spiral portion 112-6. The third inmost spiral portion 112-5 has a fifth radius of curvature corresponding to distance R6. The third outmost spiral portion 112-6 has a sixth radius of curvature corresponding to distance R4 and is larger than the fifth radius of curvature. Spiral portions that are located between the third inmost spiral portion 112-5 and the third outmost spiral portion 112-6 have successively increasing radii that increase continuously and monotonously from R6 to R4. In some embodiments, the third radius of curvature of the second outmost spiral portion 112-3 and the sixth radius of curvature of the third outmost spiral portion 112-6 both correspond to distance R3. In some embodiments, the fourth radius of curvature of the second inmost spiral portion 112-4 and the fifth radius of curvature of the third inmost spiral portion 112-5 both correspond to distance R5.

As shown in FIG. 1C, second multi-mode waveguide 160-out includes a fourth plurality of spiral rounds located between a fourth inmost spiral portion 112-7 and a fourth outmost spiral portion 112-8 of second multi-mode waveguide 106-out (e.g., spiral rounds located in second annular region 106 and corresponding to second multi-mode waveguide 106-out). The fourth inmost spiral portion 112-7 has a seventh radius of curvature corresponding to distance R4. The fourth outmost spiral portion 112-8 has an eighth radius of curvature corresponding to distance R2 and is larger than the seventh radius of curvature. Spiral portions that are located between the fourth inmost spiral portion 112-7 and the fourth outmost spiral portion 112-8 have successively increasing radii that increase continuously and monotonously between R4 and R2. In some embodiments, the seventh radius of curvature does not correspond to distance R4 (e.g., the seventh radius of curvature may be greater than distance R4).

First single-mode waveguide 102-A, shown in FIG. 1C, includes curved portions having a radius of curvature that is smaller than R4 and R5.

In some embodiments, the first plurality of spiral rounds (corresponding to first multi-mode waveguide 106-in), the second plurality of spiral rounds (corresponding to first coupler 104-in), the third plurality of spiral rounds (corresponding to second coupler 104-out), and the fourth plurality of spiral rounds (corresponding to second multi-mode waveguide 106-out) are concentric spiral rounds.

As shown in FIG. 1D, optical delay device 100 includes center region 102 where first single-mode waveguide 102-A shown in FIG. 1C is located. Optical delay device also includes a first annular region 104 between a virtual circle with a radius corresponding to distance R5 and a virtual circle with a radius corresponding to distance R3 that surrounds center region 102, and a second annular region 106 between a virtual circle with a radius corresponding to distance R3 and a virtual circle with a radius corresponding to distance R1 that surrounds first annular region 104 and center region 102. First coupler 104-in or at least a portion (e.g., a majority portion, or more than 90 percent) of first coupler 104-in are located within the first annular region 104. Likewise, second coupler 104-out or at least a portion (e.g., a majority portion, or more than 90 percent) of second coupler 104-out are located within the first annular region 104. First multi-mode waveguide 106-in, or at least a portion (e.g., a majority portion, or more than 90%) of first multi-mode waveguide 106-in are located within the second annular region 106. Likewise, second multi-mode waveguide 106-out, or at least a portion (e.g., a majority portion, more than half) of second multi-mode waveguide 106-out are located within the second annular region 106.

In some embodiments, center region 102 has a diameter that is between 10 micrometers and 500 micrometers (i.e., 10 micrometers<R5<500 micrometers). In some embodiments, center region 102 has a diameter that is approximately 300 micrometers (i.e., R5~300 micrometers). Once R5 is fixed, other dimensions (e.g., R3, R1) can be determined based on required lengths for the corresponding parts (e.g., first coupler 104-in, and first multimode waveguide 106-in) of optical delay device 100. For example, in certain embodiments, R5 is approximately 100 micrometers, and R3 is approximately 130 micrometers. In another example, R5 is approximately 10 micrometers, and R3 is approximately 100 micrometers.

FIG. 1E provides a zoomed-in view of an area 104c of optical delay device 100, corresponding to area 104c of optical delay device 100 shown in FIG. 1D. Area 104c includes center region 102, first annular region 104, and portions of second annular region 106 of optical delay device 100 in accordance with some embodiments. FIG. 1E also provides a further zoomed view in inset B showing first coupler 104-in in first annular region 104 having decreasing width as it spirals inward toward center region 102, and second coupler 104-out in first annular region 104 having increasing width as it spirals outward from center region 102.

Figure 1F:
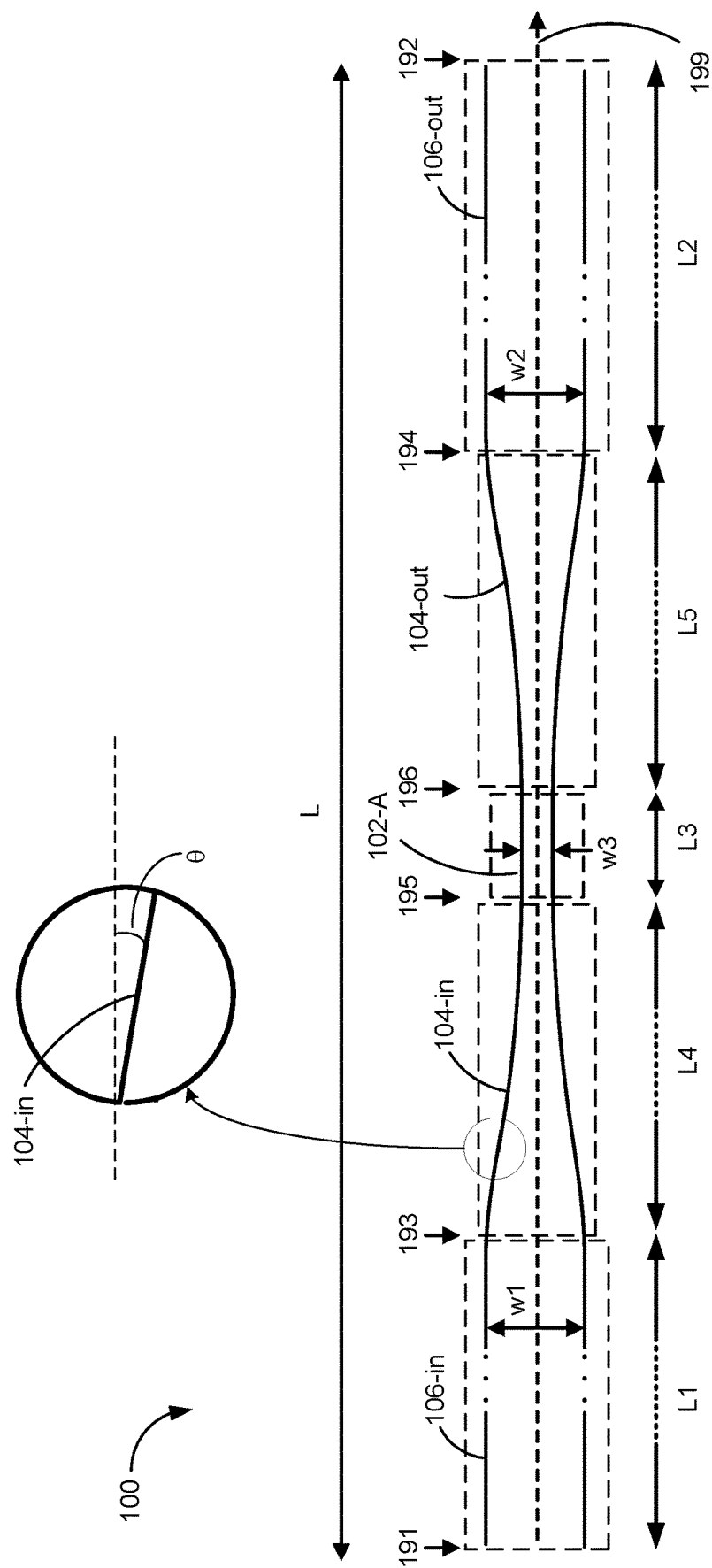
FIG. 1F is a linearized view of the optical delay device shown in FIGS. 1A-1D in accordance with some embodiments.

FIG. 1F is a linearized (or stretched-out) view of optical delay device 100 shown in FIGS. 1A-1D and illustrates the dimensions of various portions of optical delay device 100. As shown in FIG. 1F, optical delay device 100 provides an optical path having an overall length of L for light 199 propagating through:
first multi-mode waveguide 106-in;
first coupler 104-in;
first single-mode waveguide 102-A;
second coupler 104-out; and
second multi-mode waveguide 106-out.

As shown in FIG. 1F, first multi-mode waveguide 106-in has a first length L1, second multi-mode waveguide 106-out has a second length L2, and first single-mode waveguide 102-A has a third length L3 that is much smaller than each of the first length L1 and the second length L2 (i.e., L3<<L1, L2). In some embodiments, the third length L3 depends on distance R5 or R6. For example, in some embodiments, third length L3 is between two to four times distance R5. Since R5 can be between 10 micrometers to 500 micrometers, third length L3 can be between 20 micrometers and 2,000 micrometers. For example, in some embodiments, R5 is 10 micrometers, L3 is between 30 micrometers and 40 micrometers. In another example, when R5 is 500 micrometers, L3 is between 1,500 micrometers and 2000 micrometers. For example, in some embodiments, third length L3 is approximately 400 micrometers, and first length L1 and second length L2 in combination can constitute a majority (e.g., more than 90%) of the overall optical path length L, which can be in the range of tens of centimeters. In some embodiments, the first length L1 and the second length L2 are substantially the same (e.g., differing by less than 1% or 0.001%).

In some embodiments, it is desirable for the first multi-mode waveguide 160-in and the second multi-mode waveguide 160-out to constitute the majority of the waveguide length.

In some embodiments, first coupler 104-in has a fourth length L4 and second coupler 104-out has a fifth length L5. In some embodiments, fourth length L4 is less than first length L1, fifth length L5 is less than second length L2, and third length L3 is smaller than each of fourth length L4 and fifth length L5 (i.e., L3<L4, L5). In some embodiments, fourth length L4 and fifth length L5 are substantially the same (e.g., differing by less than 1% or 0.001%). In some embodiments, fourth length L4 and fifth length L5 are each greater than 1 millimeter. In some embodiments, fourth length L4 and fifth length L5 are approximately 3 millimeters.

Equation 1 may be used to determine first length L1 of first multi-mode waveguide 160-in and second length L2 of second multi-mode waveguide 160-out, assuming that the two multi-mode waveguides are equal in length:

$$L_{1,2} = \frac{L}{2} - L_{4,5} - \frac{L_3}{2} \qquad (1)$$

In Equation 1, $L_{1,2}$ is the first length L1 or second length L2, L is the overall length, $L_{4,5}$ is the fourth length L4 or fifth length L5, and $L_3$ is the third length L3.

For example, for an optical delay device that has an overall optical path length L of 40 centimeters (e.g., L=400 millimeters), a third length L3 of 0.4 millimeters, a fourth length L4 of 3 millimeters, and a fifth length L5 of 3 millimeters, each of the first length L1 and the second length L2 would be approximately 197 millimeters (e.g., L1, L2=19.7 centimeters). In another example, for an optical delay device that has an optical path length L of 80 centimeters (e.g., L=800 millimeters) and all other lengths as described in the previous example, each of the first length L1 and the second length L2 would be approximately 397 millimeters (e.g., L1, L2=39.7 centimeters). In some embodiments, the combined first length L1 of the first multi-mode waveguide 160-in and second length L2 of the second multi-mode waveguide 160-out constitute at least 95% of the overall length of optical delay device (e.g., L1+L2≥95% L). Preferably, the combined first length L1 of the first multi-mode waveguide 160-in and second length L2 of the second multi-mode waveguide 160-out constitute at least 98% of the total combined waveguide length of optical delay device (e.g., L1+L2≥98% L).

As shown in FIG. 1F, first multi-mode waveguide 106-in has a first width w1, second multi-mode waveguide 106-out has a second width w2, and first single-mode waveguide 102-A has a third width w3 that is smaller than each of the first width w1 and the second width w2 (i.e., w3<w1, w2). First coupler 104-in has a width that tapers from the first width w1 to the third width w3. Second coupler 140-out has a width that tapers from the third width w3 to the second width w2. In some embodiments, the first width w1 and the second width w2 are substantially the same (e.g., w1~w2, differing by less than 1%). In some embodiments, the first width w1 and the second width w2 are between 3 micrometers and 4 micrometers (e.g., 3 micrometers≤w1, w2≤4 micrometers). In some embodiments, the first width w1 and the second width w2 are at least 3 micrometers (e.g., w1, w2≥3 micrometers). In some embodiments, the first width w1 and the second width w2 are at least 1 micrometer (e.g., w1, w2≥1 micrometers). In some embodiments, the third width w3 is between 400 nanometers and 500 nanometers (e.g., 400 nanometers<w3<500 nanometers). In some embodiments, the third width w3 is less than 1 micrometer (e.g., w3<1 micrometers).

First coupler 104-in is configured to adiabatically couple light from first multi-mode waveguide 106-in to first single-mode waveguide 102-A. Second coupler 104-out is configured to adiabatically couple light from first single-mode waveguide 102-A to second multi-mode waveguide 106-out. For example, one or more of first coupler 104-in and second coupler 104-out may have a linear taper profile, a parabolic taper profile, or an exponential taper profile. For example, first coupler 104-in or second coupler 104-out can have a length of at least 100 micrometers, a largest tapering angle θ in first coupler 104-in or second coupler 104-out is less than 0.3 degrees.

Figure 1G:
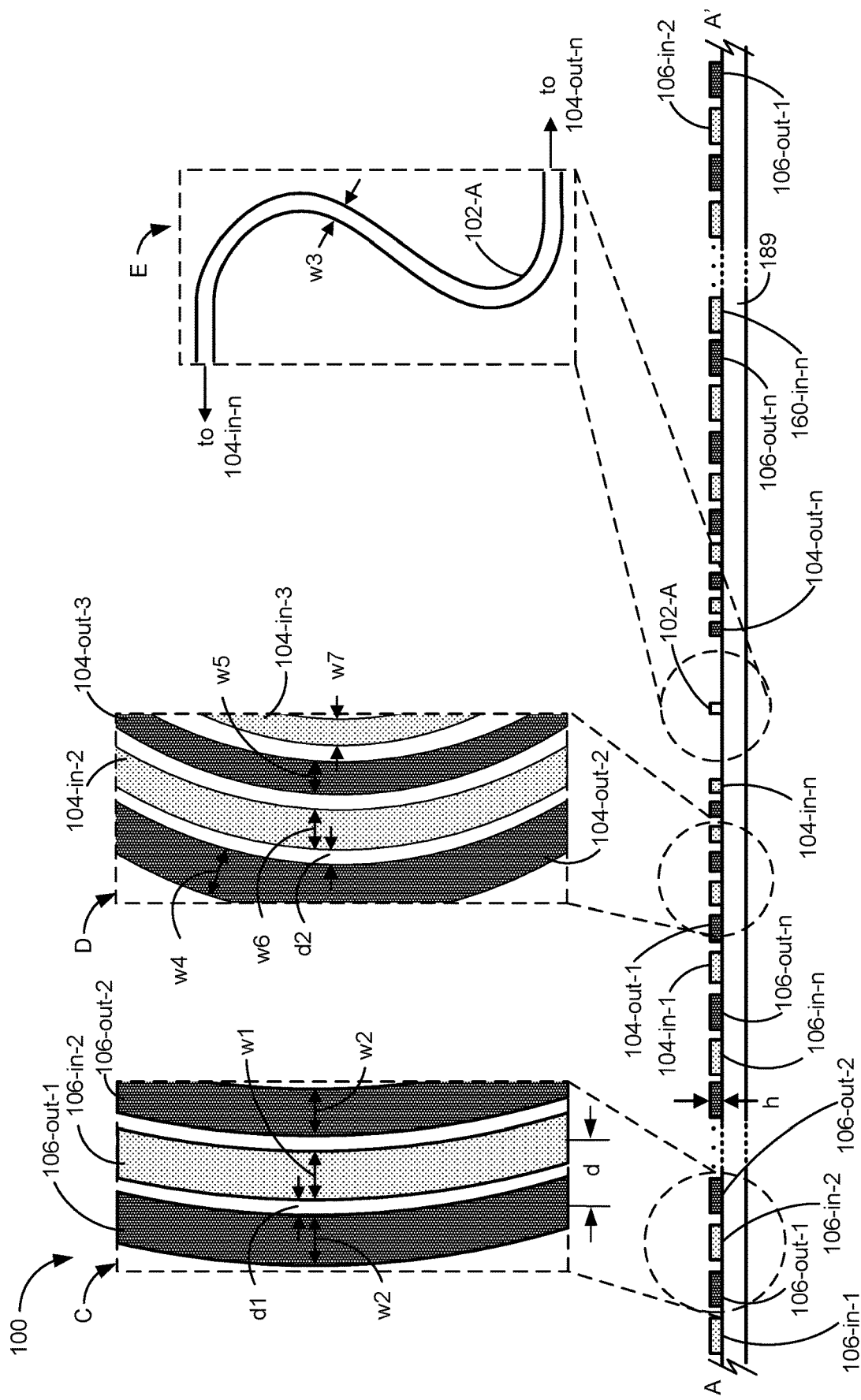
FIG. 1G is a cross-sectional view of the optical delay device shown in FIGS. 1A-1D in accordance with some embodiments.

FIG. 1G is a cross-sectional view of optical delay device 100 shown in FIGS. 1B-1D. Cross-sectional views of the first plurality of spiral rounds corresponding to first multi-mode waveguide 106-in, the second plurality of spiral rounds corresponding to first coupler 104-in, the third plurality of spiral rounds corresponding to second coupler 104-out, the fourth plurality of spiral rounds corresponding to second multi-mode waveguide 106-out, and first single-mode waveguide 102-A are shown. FIG. 1G also includes insets illustrating top views of various portions of optical delay device 100. In FIG. 1G, bonded shapes with a lighter fill pattern correspond to portions of waveguides that are configured to transmit light toward first single-mode waveguide 102-A, i.e., the first plurality of spiral rounds (e.g., 106-in-1 to 106-in-n) and the second plurality of spiral rounds (e.g., 104-in-1 to 104-in-n) corresponding to first multi-mode waveguide 106-in and first coupler 104-in, respectively. Likewise, bonded shapes with a darker fill pattern correspond to portions of waveguides that are configured transmit light away from first single-mode waveguide 102-A, i.e., the third plurality of spiral rounds (e.g., 104-out-1 to 104-out-n) and the fourth plurality of spiral rounds (e.g., 106-out-1 to 106-out-n) corresponding to second coupler 104-out second multi-mode waveguide 106-out, respectively. Bonded shapes with no fill pattern correspond to the first single-mode waveguide 102-A.

Referring to inset C, which shows a top view of a portion of second annular region 106, the first plurality of spiral rounds (e.g., 106-in-1 to 106-in-n) is interleaved with the fourth plurality of spiral rounds (e.g., 106-out-1 to 106-out-n). Any portion of the first plurality of spiral rounds is separated from any adjacent portion of the fourth plurality of spiral rounds by a distance d1, which is designed to be large enough in order to prevent light propagating in the first plurality of spiral rounds from being evanescently coupled into the fourth plurality of spiral rounds. As shown in inset C, waveguide portion 106-in-2, which is a portion of the first plurality of spiral rounds and has the first width w1, is located between waveguide portions 106-out-1 and 106-out-2, which are portions of the fourth plurality of spiral rounds and have the second width w2. A respective sidewall of waveguide portion 106-in-2 is spaced apart from a respective sidewall of waveguide portions 106-out-1 and 106-out-2 by distance d1. In some embodiments, distance d1 is greater than or equal to 1 micrometer (e.g., d1≥1 micrometer). In some embodiments, distance d1 is greater than or equal to 2 micrometers (e.g., d1≥2 micrometers). In some embodiments, distance d1 is greater than or equal to 8 micrometers. Thus, any portion of the first plurality of spiral rounds is separated from any adjacent portion of the fourth plurality of spiral rounds by distance d1, which is designed to be large enough in order to prevent light propagating in the first plurality of spiral rounds from being evanescently coupled into the fourth plurality of spiral rounds (or vice versa).

Referring to inset D, which shows a top view of a portion of first annular region 104, the second plurality of spiral rounds (e.g., 104-in-1 to 104-in-n) is interleaved with the third plurality of spiral rounds (e.g., 104-out-1 to 104-out-n). Any portion of the second plurality of spiral rounds is separated from any adjacent portion of the third plurality of spiral rounds by distance d2, which is designed to be large enough in order to prevent light propagating in the second plurality of spiral rounds from being evanescently coupled into the third plurality of spiral rounds (or vice versa). As shown in inset D, waveguide portion 104-in-2, which is a portion of the second plurality of spiral rounds, is located adjacent to and between waveguide portions 104-out-2 and 104-out-3, which are portions of the third plurality of spiral rounds. Waveguide portion 104-out-2 has a fourth width w4 and waveguide portion 104-out-3 has a fifth width w5 that is smaller than fourth width w4. Fourth width w4 is smaller than second width w2 of second multi-mode waveguide 106-out and fifth width w5 is larger than third width w3 of first single-mode waveguide 102-A (i.e., w2>w4>w5>w3). Waveguide portion 104-in-2 has a sixth width w6 a that is similar to fourth width w4 and a seventh width w7 that is substantially equal (e.g., similar) to fifth width w5. Sixth width w6 is smaller than first width w1 of first multi-mode waveguide 106-in and seventh width w7 is larger than third width w3 of first single-mode waveguide 102-A. In some embodiments, width w6 is equal to or less than width w4 of waveguide portion 104-out-2 and width w7 is equal to or greater than width w5 of waveguide portion 104-out-3. A respective sidewall of waveguide portion 104-in-2 is spaced apart from a respective sidewall of waveguide portions 104-out-2 and 104-out-3 by distance d2. In some embodiments, distance d2 is greater than 1 micrometer and preferably, greater than or equal to 2 micrometers. In some embodiments, adjacent spiral rounds are separated by a predetermined distance so that light is not evanescently coupled between adjacent spiral rounds. In some embodiments, the predetermined distance is greater than 1 micrometer and preferably, greater than or equal to 2 micrometers.

In some embodiments, the first plurality of spiral rounds (e.g., 106-in-1 to 106-in-n) has a first number of spiral rounds and the second plurality of spiral rounds (e.g., 104-in-1 to 104-in-n) has a second number of spiral rounds. In some embodiments, the third plurality of spiral rounds (e.g., 104-out-1 to 104-out-n) has a third number of spiral rounds that corresponds to (e.g., equals, is substantially the same as, differs by no more than 1 spiral round) the second number of spiral rounds. In some embodiments, the fourth plurality of spiral rounds (e.g., 106-out-1 to 106-out-n) has a fourth number of spiral rounds that corresponds to (e.g., equals, is substantially the same as, differs by no more than 1 spiral round) the first number of spiral rounds.

For example, for an optical delay device that has an optical path corresponding to a 5 nanosecond delay, the first number of spiral rounds or the fourth number of spiral rounds is approximately 130. In another example, for an optical delay device that has an optical path corresponding to a 10 nanosecond delay, the first number of spiral rounds or the fourth number of spiral rounds is approximately 190.

For example, the second number of spiral rounds or the third number of spiral rounds is approximately 7 spiral rounds. In some embodiments, the second number of spiral rounds or the third number of spiral rounds is independent of the optical path length L of optical delay device 100.

In some embodiments, optical delay device 100 includes at least 10 spiral rounds (e.g., a total number of spiral rounds in the first plurality of spiral rounds, the second plurality of spiral rounds, the third plurality of spiral rounds, and the fourth plurality of spiral rounds is at least 10). In some embodiments, optical delay device 100 includes at least 100 spiral rounds (e.g., the total number of spiral rounds in the first plurality of spiral rounds, the second plurality of spiral rounds, the third plurality of spiral rounds, and the fourth plurality of spiral rounds is at least 100). For example, for an optical delay device that has an optical path corresponding to a 5 nanosecond delay, the total number of spiral rounds is approximately 140, the optical path length L is approximately 40 centimeters, and the optical delay device would have lateral dimensions of approximately 1.7 millimeters by 1.7 millimeters (e.g., a maximum diameter of approximately 0.85 millimeters).

In another example, for an optical delay device that has an optical path corresponding to a 10 nanosecond delay, the total number of spiral rounds is approximately 200, the optical path length is approximately 80 centimeters, and the optical delay device would have lateral dimensions of approximately 2.3 millimeters by 2.3 millimeters (e.g., a maximum diameter of approximately 1.15 millimeters).

In another example, for an optical delay device that has an optical path length L that is approximately 160 centimeters, the optical delay device would have lateral dimensions of approximately 3.4 millimeters by 3.4 millimeters (e.g., a maximum diameter of approximately 1.7 millimeters).

Referring to inset E, which shows a top view of a portion of center region 102, first single-mode waveguide 102-A having third width w3 is shown located in center region 102. A first end of first single-mode waveguide 102-A is coupled to waveguide portion 104-in-n, which is a portion of first coupler 104-in, and a second end of first single-mode waveguide 102-A is coupled to waveguide portion 104-out-n, which is a portion of second coupler 104-out. As shown, first single-mode waveguide 102-A includes one or more bends. Although only two bends are shown in inset E, first single-mode waveguide 102-A may include any number of bends.

In some embodiments, as shown, first multi-mode waveguide 106-in, second multi-mode waveguide 106-out, first single-mode waveguide 102-A, first coupler 104-in, and second coupler 104-out are formed in a same layer of a material or in a same layer of two or more materials on a substrate 189. In some embodiments, first multi-mode waveguide 106-in, second multi-mode waveguide 106-out, first single-mode waveguide 102-A, first coupler 104-in, and second coupler 104-out have a same height h. In some embodiments, the layer of material has a largely uniform thickness and/or height.

Figure 2A:
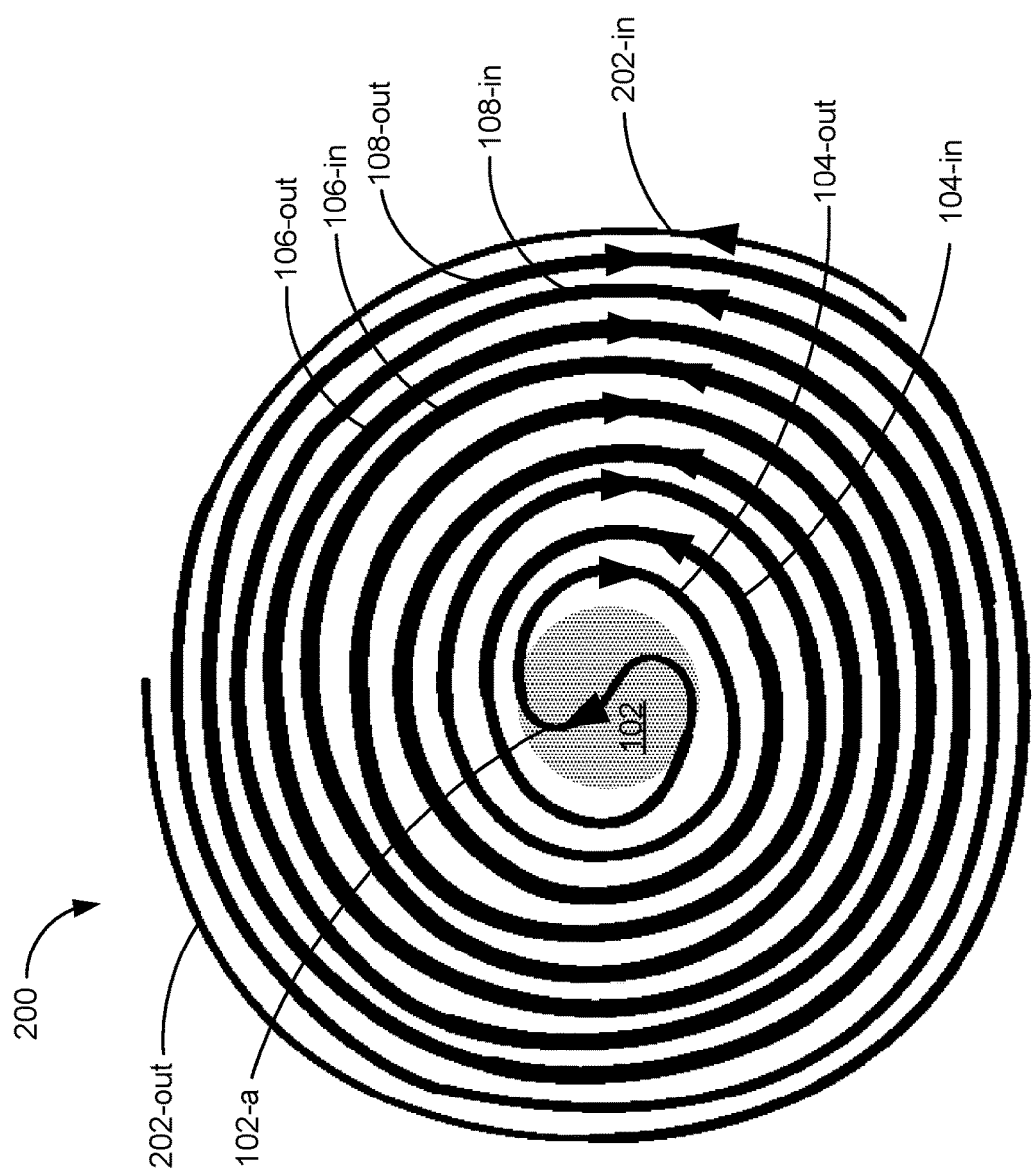
FIG. 2A is a simplified diagram illustrating an optical delay device and an optical path of light propagating through different portions of the optical delay device in accordance with some embodiments.

FIG. 2A illustrates an optical delay device 200 and an optical path of light propagating through optical delay device 200 in accordance with some embodiments. Optical delay device 200 includes waveguides (e.g., first multi-mode waveguide 106-in, second multi-mode waveguide 106-out, and first single-mode waveguide 102-A), couplers (e.g., first coupler 104-in and second coupler 104-out), and regions (e.g., center region 102, first annular region 104, second annular region 106) described above with respect to optical delay device 100 in FIGS. 1A-1C and details regarding such features are not repeated here for brevity.

In addition to the waveguides and couplers described with respect to optical delay device 100, optical delay device 200 also includes an input coupler 108-in and an output coupler 108-out. Input coupler 108-in is coupled (e.g., physically, optically) to first multi-mode waveguide 106-in at the location of input 191 and is configured to receive light from input coupler 108-in and propagate the light toward first coupler 104-in. Output coupler 108-out is coupled (e.g., physically, optically) to second multi-mode waveguide 106-out at the location of output 192 and is configured to propagate light received from second coupler 104-out toward output coupler 108-out.

Figure 2B:
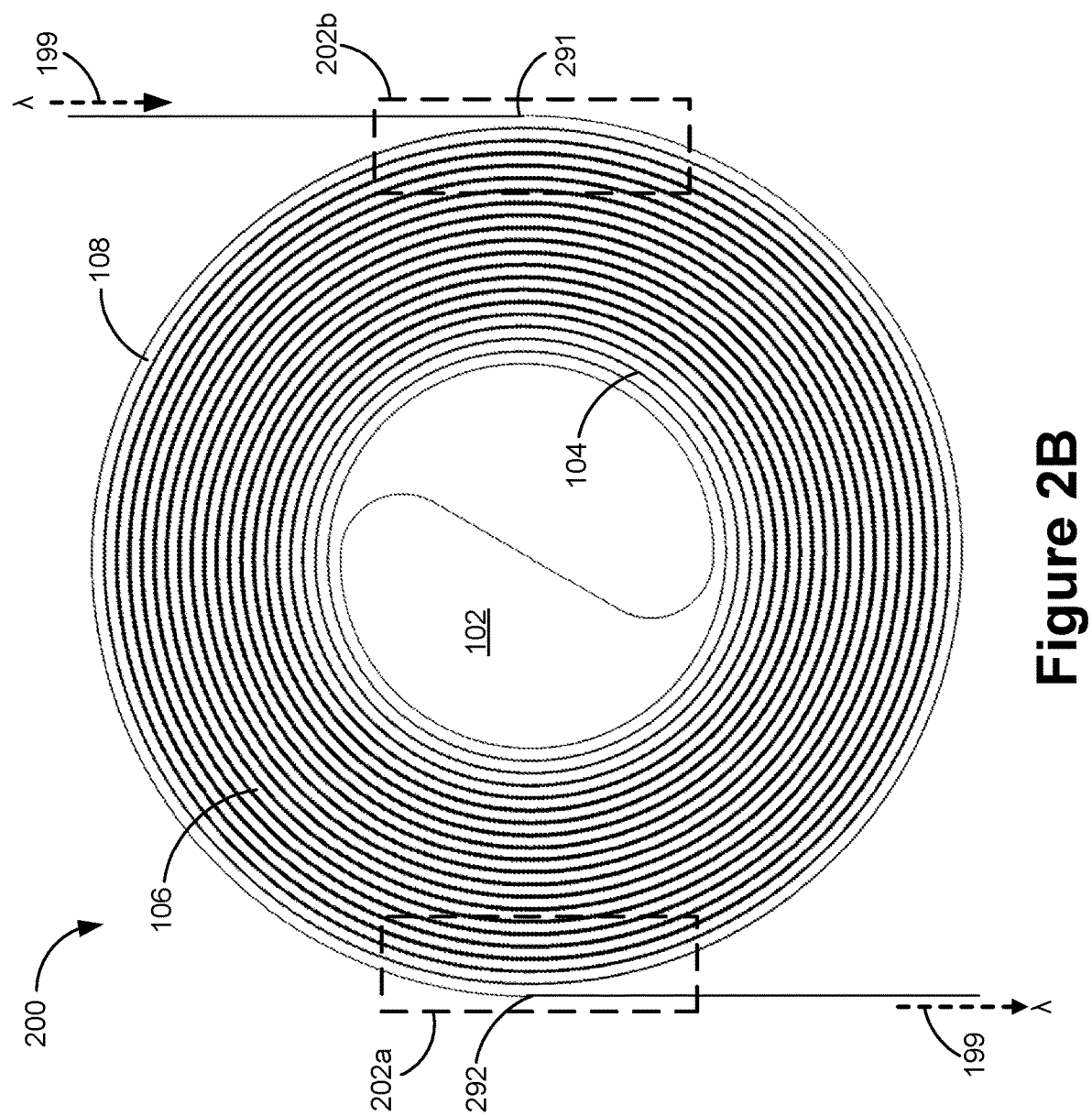
FIGS. 2B-2C are plan views of an optical delay device in accordance with some embodiments.
Figure 2C:
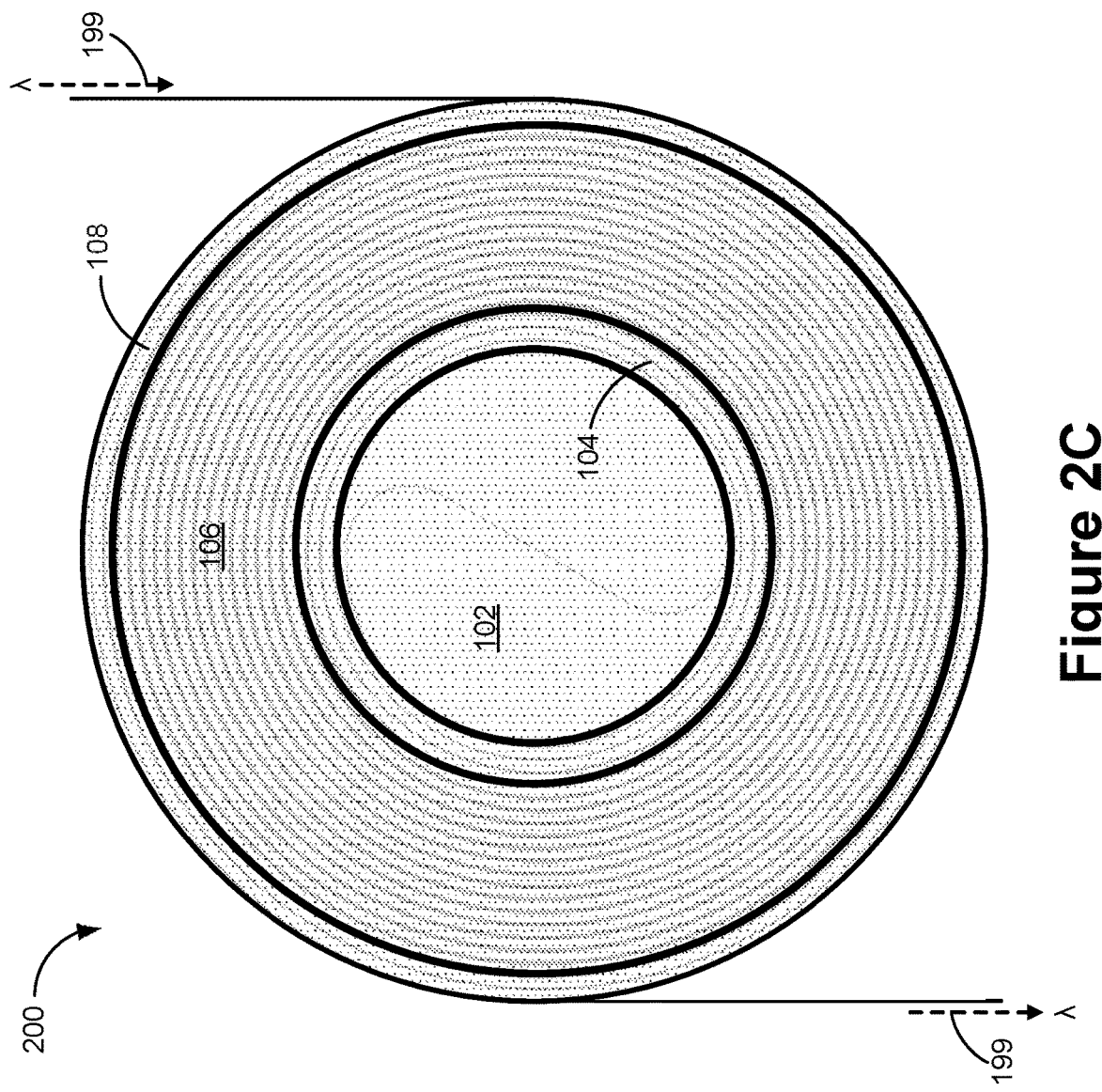
Figure 2D:
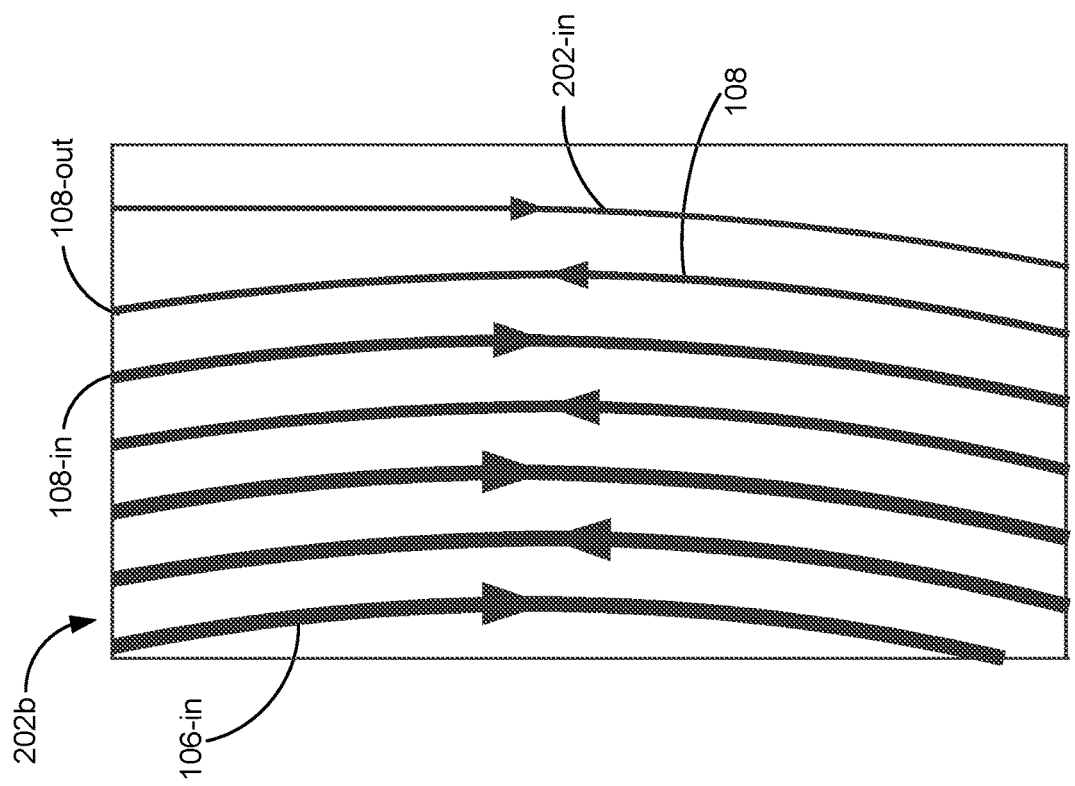
FIG. 2D is a partial plan view of an optical delay device illustrating an input region of the optical device shown in FIGS. 2A-C in accordance with some embodiments.
Figure 2D:
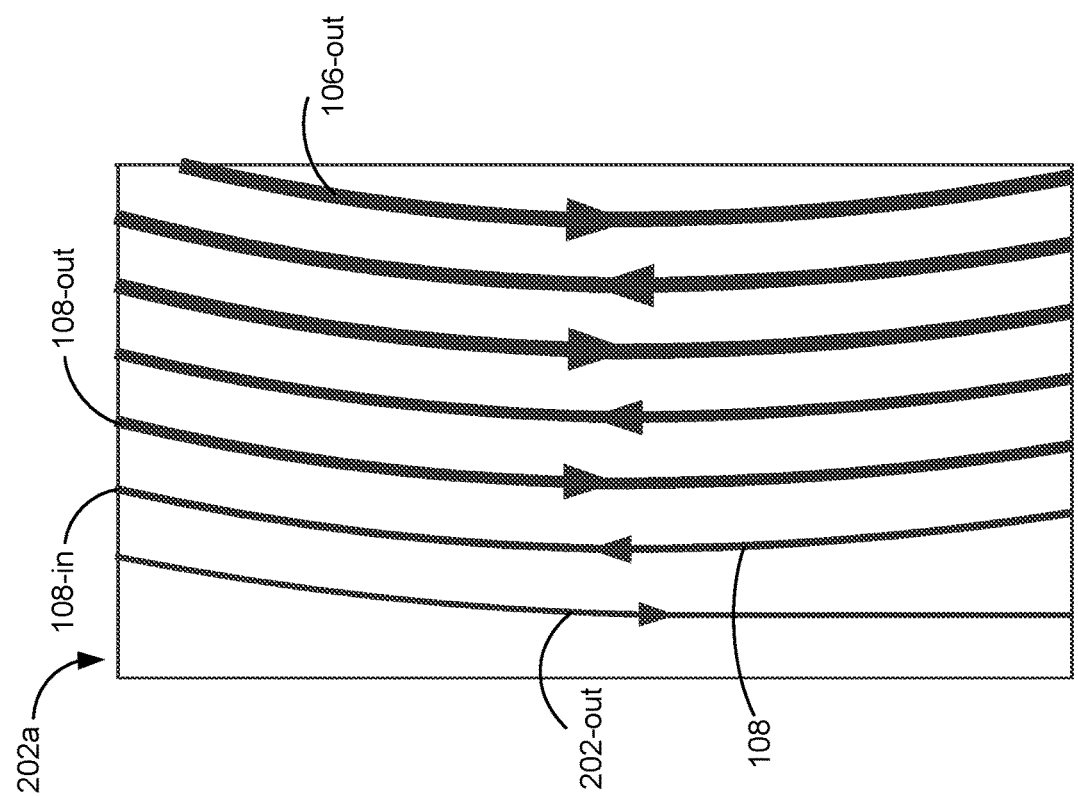
Figure 2E:
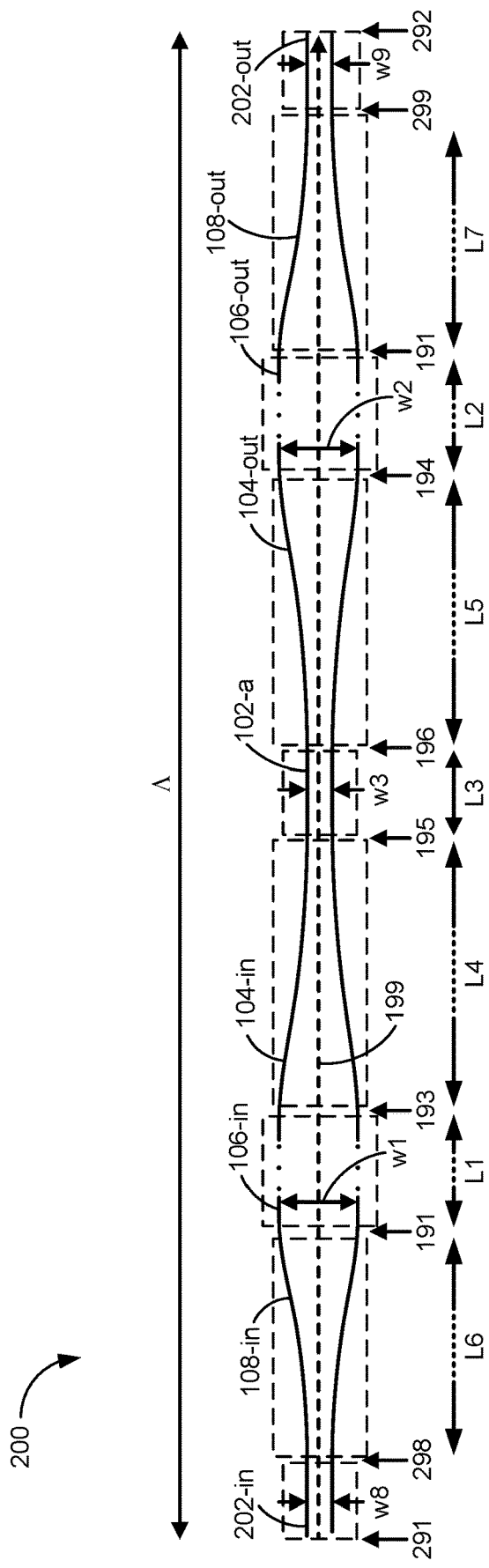
FIG. 2E is a linearized view of the optical delay device shown in FIGS. 2A-2C in accordance with some embodiments.

In some embodiments, optical delay device may also include an input single-mode waveguide 202-in that is coupled to input coupler 108-in at junction 298 (shown in FIG. 2E). Input single-mode waveguide 202-in is configured to receive light and transmit light toward input coupler 108-in. In some embodiments, optical delay device may also include an output single-mode waveguide 202-out that is coupled to output coupler 108-out at junction 299 (shown in FIG. 2E). Output single-mode waveguide 202-out is configured to receive light from output coupler 108-out and output the light.

Lines with upward pointing arrows correspond to waveguides that spiral inward towards center region 102 (e.g., input single-mode waveguide 202-in, input coupler 108-in, first multi-mode waveguide 106-in, and first coupler 104-in) and lines with downward pointing arrows correspond to waveguides that spiral outwards from center region 102 (e.g., output single-mode waveguide 202-out, output coupler 108-out, second multi-mode waveguide 106-out, and second coupler 104-out).

FIGS. 2B and 2C are plan views of optical delay device 200 in accordance with some embodiments. In addition to features described above with respect to optical delay device 100, optical delay device 200 also includes a third annular region 108 that surrounds second annular region 106, which surrounds first annular region 104, which surrounds center region 102. At least a portion (e.g., a majority portion, more than 90%) of each of input coupler 108-in and output coupler 108-out are disposed in (e.g., located in) third annular region 108.

In some embodiments, when optical delay device includes input single-mode waveguide 202-in and output single-mode waveguide 202-out, at least a portion of each of input single-mode waveguide 202-in and output single-mode waveguide 202-out are disposed in (e.g., located in) third annular region 108.

Optical delay device 200 is configured to receive light 199 at input 291 and to propagate light 199 through waveguide portions within third annular region 108 toward second annular region 106, through second annular region 106 toward first annular region 104, through first annular region 104 toward center region 102, through center region 102 toward first annular region 104, through first annular region 104 toward second annular region 106, and then through second annular region 106 toward third annular region 108, and to output light 199 at output 292.

FIG. 2D shows zoomed-in views of an output region 202a of optical delay device 200 and an input region 202b of optical delay device 200, respectively, as shown in FIG. 2B, in accordance with some embodiments. As shown, input coupler 108-in includes a portion that has a radius of curvature that is substantially the same as (e.g., same, equal to, differing by less than 5%) the first radius of curvature of first outmost spiral round 112-1. Input coupler 108-in includes a portion that has a radius of curvature that is substantially the same as (e.g., differing by less than 5%) the eighth radius of curvature of fourth outmost spiral round 112-8. Input coupler 108-in and output coupler 108-out each include at least a portion of a spiral round. In some embodiments, input coupler 108-in may include a fifth plurality of spiral rounds and output coupler 108-out may include a sixth plurality of spiral rounds.

FIG. 2E is a linearized (or stretched-out) view of optical delay device 200 shown in FIG. 2B, illustrating the dimensions of various portions of optical delay device 200. As shown in FIG. 2E, optical delay device 200 provides an optical path having an overall length A for light 199 propagating through:
- input coupler 108-in;
- first multi-mode waveguide 106-in;
- first coupler 104-in;
- first single-mode waveguide 102-A;
- second coupler 104-out;
- second multi-mode waveguide 106-out; and
- output coupler 108-out.

In some embodiments, when optical delay device 200 includes input single-mode waveguide 202-in and output single-mode waveguide 202-out, the optical path of light 199 also includes:
- input single-mode waveguide 202-in; and
- output single-mode waveguide 202-out.

As shown in FIG. 2E, input coupler 108-in has a sixth length L6 and output coupler 108-out has a seventh length L7. In some embodiments, sixth length L6 and seventh length L7 are each larger than third length L3 of first single-mode waveguide 102-A (i.e., L3<<L6, L7). In some embodiments, sixth length L6 and seventh length L7 are substantially the same (e.g., differing by less than 1% or 0.1%). In some embodiments, sixth length L6 and seventh length L7 are each greater than 1 millimeter (e.g., L6, L7>1 millimeter). In some embodiments, sixth length L6 and seventh length L7 are approximately 3 millimeters (e.g., L6, L7~3 millimeters). In some embodiments, when input single-mode waveguide 102-in and output single-mode waveguide 102-out are included in optical delay device 200, the length of input single-mode waveguide 202-in between input 291 and the input coupler 108-in is about equal to the length of output single-mode waveguide 202-out between output 292 and the output coupler 108-out. In some embodiments, each of the length of input single-mode waveguide 202-in and the length of output single-mode waveguide 202-out is less than the length of an outmost spiral round (e.g., each length is less than three quarters of an outmost spiral round). Alternatively, in some embodiments, input single-mode waveguide 102-in and output single-mode waveguide 102-out are not included in optical delay device 200.

In some embodiments, input coupler 108-in includes at least a portion of a spiral turn. In some embodiments, output coupler 108-out includes at least a portion of a spiral turn.

In some embodiments, when optical delay device 200 includes input single-mode waveguide 202-in and output single-mode waveguide 202-out, input single-mode waveguide 202-in has an eighth width w8 and output single-mode waveguide 202-out has a ninth width w9. Each of eighth width w8 and a ninth width w9 is smaller than each of the first width w1 of first multi-mode waveguide 106-in and the second width w2 of second multi-mode waveguide 106-out (i.e., w8, w9<w1, w2). In some embodiments, eighth width w8 and a ninth width w9 are the substantially the same (e.g., differing by less than 5%). In some embodiments, one or more of eighth width w8 and a ninth width w9 is equal to third width w3 of first single-mode waveguide 102-A (e.g., w8, w9~w1). In some embodiments, eighth width w8 and a ninth width w9 are between 400 nanometers and 500 nanometers (e.g., 400 nanometers≤w8, w9≤500 nanometers). In some embodiments, eighth width w8 and a ninth width w9 are less than 1 micrometer (e.g., w8, w9≤1 micrometer).

Input coupler 108-in has a width that tapers from first width w1 to eighth width w8. Output coupler 108-out has a width that tapers from second width w2 to ninth width w9.

Input coupler 108-in is configured to adiabatically couple light from input single-mode waveguide 202-in to first multi-mode waveguide 106-in. Output coupler 108-out is configured to adiabatically couple light from second multi-mode waveguide 106-out to fourth single-mode waveguide 202-out. For example, one or more of input coupler 108-in and output coupler 108-out may have a linear taper profile, a parabolic taper profile, or an exponential taper profile. In some cases, a largest tapering angle θ of input coupler 108-in and output coupler 108-out is less than 0.3 degrees.

Figure 3A:
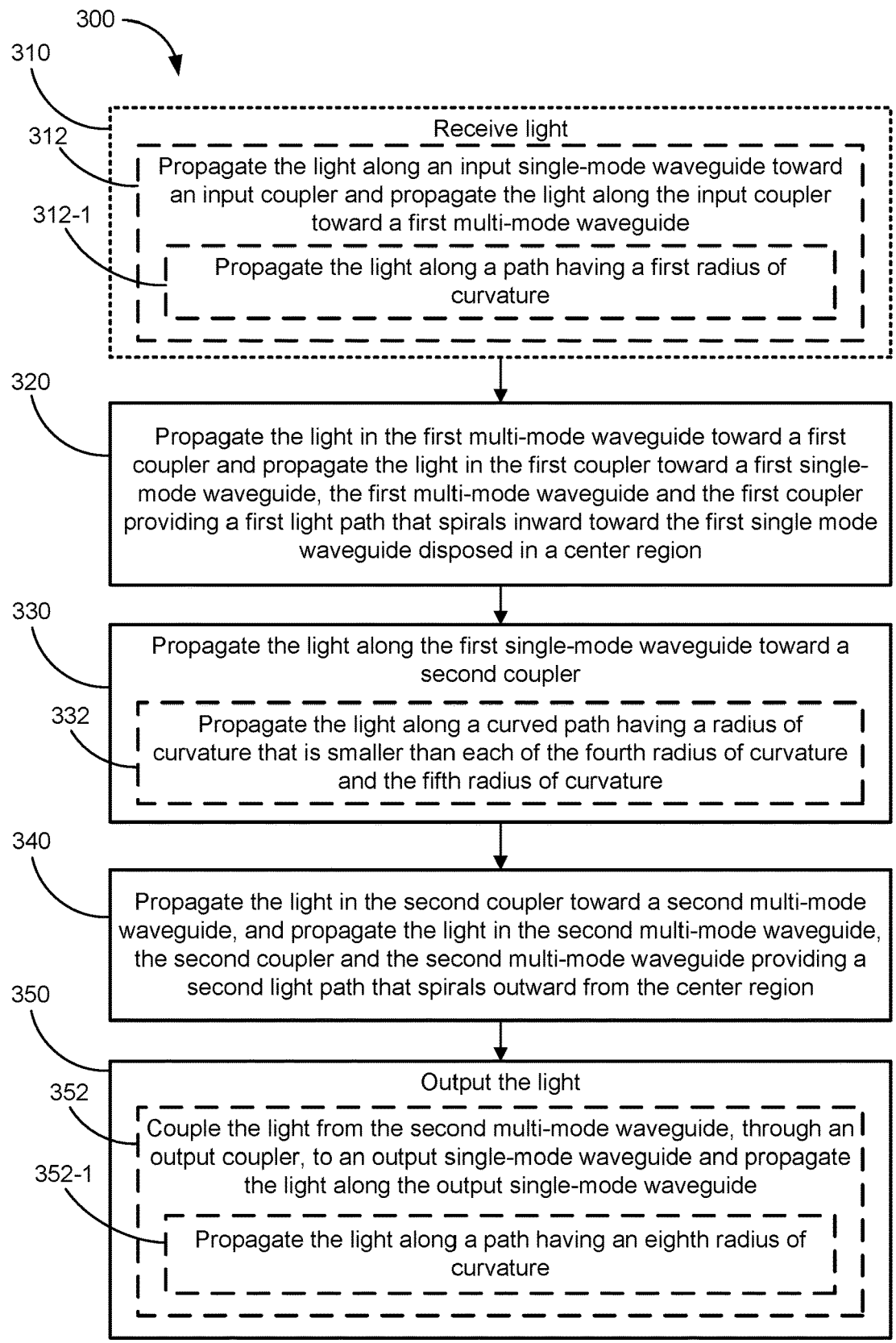
Figure 3B:
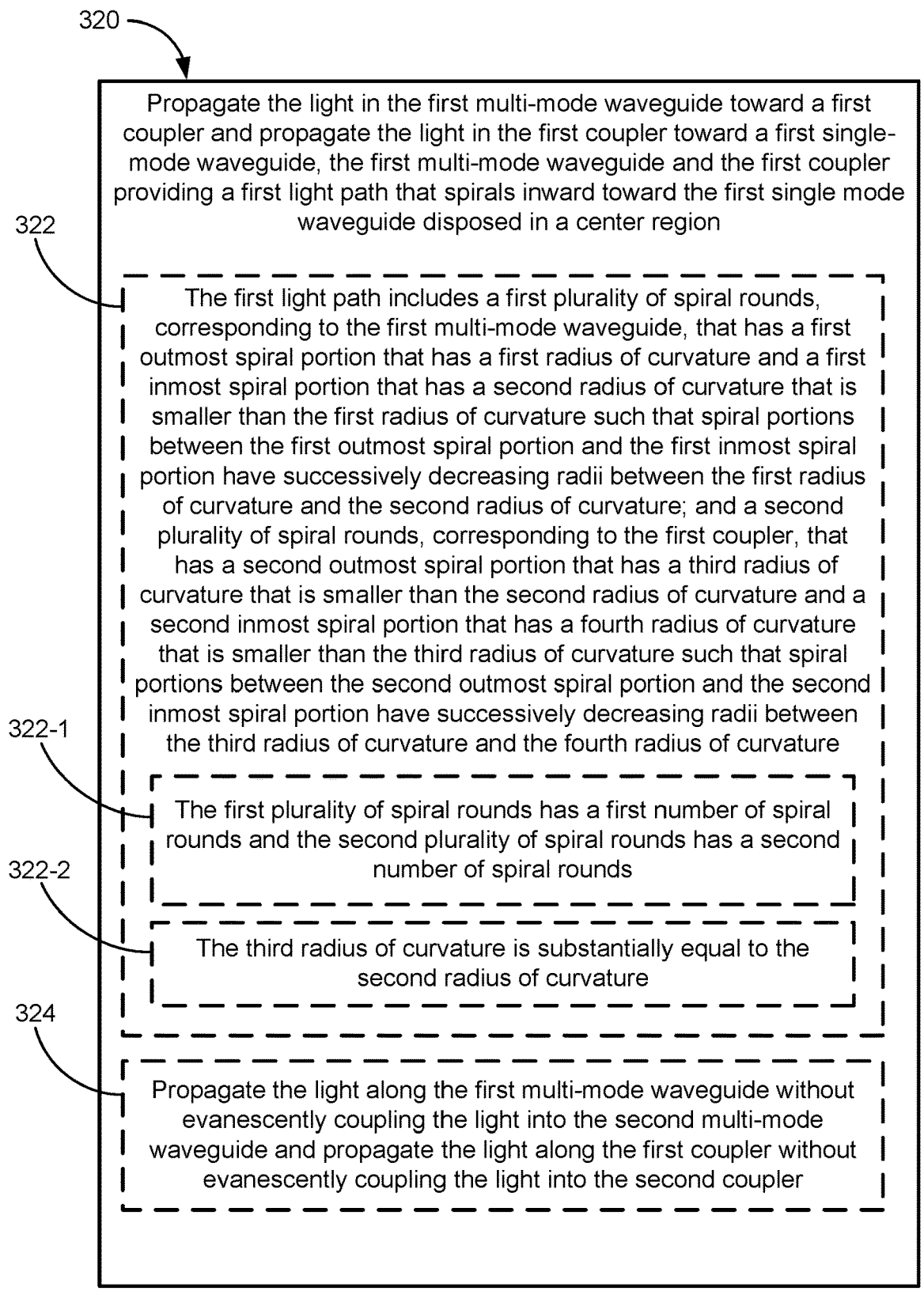

FIGS. 3A-3C are flowcharts illustrating a method of propagating light to create an optical delay in accordance with some embodiments.

The method 300 includes (310) receiving light and (312) propagating the light (e.g., light 199) along an input single-mode waveguide 202-in toward an input coupler 108-in and propagating the light along the input coupler toward a first multi-mode waveguide 106-in. In some embodiments, the method 300 also includes (312-1) propagating the light along a path having a first radius of curvature.

The method 300 also includes (320) propagating the light in the first multi-mode waveguide 106-in toward a first coupler 104-in and propagating the light in the first coupler 104-in toward a first single-mode waveguide 102-A. The first multi-mode waveguide 106-in and the first coupler 104-in provide a first light path that spirals inward toward a center region 102. The first single-mode waveguide 102-A is disposed in the center region 102.

In some embodiments, (322 shown in FIG. 3B) the first light path includes a first plurality of spiral rounds (e.g., spiral rounds 106-in-1 to 106-in-n) corresponding to the first multi-mode waveguide 106-in and a second plurality of spiral rounds (e.g., spiral rounds 104-in-1 to 104-in-n) corresponding to the first coupler 104-in. The first plurality of spiral rounds includes a first outmost spiral portion 112-1 that has a first radius of curvature and a first inmost spiral portion 112-2 that has a second radius of curvature that is smaller than the first radius of curvature. Spiral portions between the first outmost spiral portion and the first inmost spiral portion have successively decreasing radii that decreases continuously and monotonously between the first radius of curvature and the second radius of curvature. The second plurality of spiral rounds includes a second outmost spiral portion 112-3 that has a third radius of curvature that is smaller than the second radius of curvature. The second plurality of spiral rounds also includes a second inmost spiral portion 112-4 that has a fourth radius of curvature that is smaller than the third radius of curvature. Spiral portions between the second outmost spiral portion and the second inmost spiral portion have successively decreasing radii that decreases continuously and monotonously between the third radius of curvature and the fourth radius of curvature.

In some embodiments, (322-1) the first plurality of spiral rounds has a first number of spiral rounds and the second plurality of spiral rounds has a second number of spiral rounds. In some embodiments, the first number of spiral rounds is substantially the same as (e.g., not differing by more than one spiral round) the second number of spiral rounds. In some embodiments, one or more of the first number of spiral rounds and the second number of spiral rounds is more than 100.

In some embodiments, (322-2) the third radius of curvature is substantially equal to (e.g., differing by less than 5%) the second radius of curvature.

In some embodiments, (324) propagating the light along the first light path includes propagating the light along the first multi-mode waveguide 106-in without evanescently coupling the light into the second multi-mode waveguide 106-out and propagating the light along the first coupler 104-in without evanescently coupling the light into the second coupler 104-out.

The method 300 also includes (330 shown FIG. 3A) propagating light along the first single-mode waveguide 102-A toward a second coupler 104-out. In some embodiments, the method 300 also includes (332) propagating the light along a curved path having a radius of curvature that is smaller than each of a fourth radius of curvature and a fifth radius of curvature.

The method 300 also includes (340) propagating the light in the second coupler 104-out toward a second multi-mode waveguide 106-out and propagating the light in the second multi-mode waveguide 106-out. The second coupler 104-out and the second multi-mode waveguide 106-out provide a second light path that spirals outward from the center region 102.

In some embodiments, (342) the second light path includes a third plurality of spiral rounds (e.g., 104-out-1 to 104-out-n) corresponding to the second coupler 104-out and a fourth plurality of spiral rounds (e.g., 106-out-1 to 106-out-n) corresponding to the second multi-mode waveguide 106-out. The third plurality of spiral rounds includes a third inmost spiral portion 112-5 that has a fifth radius of curvature and a third outmost spiral portion 112-6 that has a sixth radius of curvature that is larger than the fifth radius of curvature. Spiral portions between the third inmost spiral portion and the third outmost spiral portion have successively increasing radii that increases continuously and monotonously between the fifth radius of curvature and the sixth radius of curvature. The fourth plurality of spiral rounds includes a fourth inmost spiral portion 112-7 that has a seventh radius of curvature that is smaller than the sixth radius of curvature. The fourth plurality of spiral rounds also includes a fourth outmost spiral portion 112-8 that has an eighth radius of curvature that is larger than the seventh radius of curvature. Spiral portions between the fourth inmost spiral portion and the fourth outmost spiral portion have successively increasing radii that increases continuously and monotonously between the seventh radius of curvature and the eighth radius of curvature. In some embodiments, (342-1) the third plurality of spiral rounds has a third number of spiral rounds that corresponds to (e.g., equals to, differs by less than 2 spiral rounds) the second number of spiral rounds and the fourth plurality of spiral rounds has a fourth number of spiral rounds that corresponds (e.g., equals to, differs by less than 2 spiral rounds) to the first number of spiral rounds. In some embodiments, (342-2) the eighth radius of curvature is substantially equal to (e.g., differing by less than 5%) the first radius of curvature, the seventh radius of curvature is substantially equal to (e.g., differing less than 5%) the second radius of curvature, the sixth radius of curvature is substantially equal to (e.g., differing by less than 5%) the third radius of curvature, and the fifth radius of curvature is substantially equal to (e.g., differing by less than 5%) the fourth radius of curvature. In some embodiments, (344) propagating light along the second light path includes propagating the light along the second coupler 104-out without evanescently coupling the light into the first coupler 104-in and propagating the light along the second multi-mode waveguide 106-out without evanescently coupling the light into the first multi-mode waveguide 106-in.

The method 300 also includes (350) outputting the light. In some embodiments, the method also includes (352) coupling the light from the second multi-mode waveguide 106-out, through an output coupler 108-out, to an output single-mode waveguide 202-out and propagating the light along the output single-mode waveguide 202-out. In some embodiments, the method 300 also include (352-1) propagating the light along a path having an eighth radius of curvature.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. For example, although FIGS. 1A-1G illustrate an optical delay device that includes a first multi-mode waveguide, a second multi-mode waveguide, a first single-mode waveguide, a first coupler, and a second coupler, additional waveguides can be added to increase the number spiral rounds, such as described above with respect to FIGS. 2A-2E. In some embodiments, fewer components may be used. For example, in accordance with some embodiments, an optical device includes a first multi-mode waveguide; a first optical coupler coupled to the first multi-mode waveguide, the first coupler being tapered and curved; and a first single-mode waveguide having a first end coupled to the first optical coupler. Such device may be used in an optical delay device or other optical devices. The embodiments were chosen in order to best explain the principles underlying the claims and their practical applications, to thereby enable others skilled in the art to best use the embodiments with various modifications as are suited to the particular uses contemplated.

What is claimed is:

1. An optical device, comprising:
a first multi-mode waveguide, wherein the first multi-mode waveguide includes a first plurality of spiral rounds;
a first optical coupler coupled to the first multi-mode waveguide, the first optical coupler being tapered and curved; and
a first single-mode waveguide having a first end coupled to the first optical coupler, wherein a first portion of the first single-mode waveguide has a first single-mode radius of curvature having a first center, a second portion of the first single-mode waveguide has a second single-mode radius of curvature having a second center, and at least a portion of the first single-mode waveguide is located between the first center and the second center.

2. The optical device of claim 1, wherein:
the optical device is an optical delay device.

3. The optical device of claim 1, wherein:
the first multi-mode waveguide has a first width;
the first single-mode waveguide has a second width smaller than the first width; and
a width of the first optical coupler tapers from the first width to the second width.

4. The optical device of claim 3 further comprising:
a second multi-mode waveguide distinct and separate from the first multi-mode waveguide; and
a second optical coupler coupled with the second multi-mode waveguide and a second end, opposite to the first end, of the first single-mode waveguide, the second optical coupler being tapered and curved.

5. The optical device of claim 4, wherein:
the second multi-mode waveguide has a third width greater than the second width; and
a width of the second optical coupler tapers from the second width to the third width.

6. The optical device of claim 1, further comprising:
a second single-mode waveguide; and
a third optical coupler having a first end coupled to the second single-mode waveguide and a second end coupled to a first end of the first multi-mode waveguide, wherein the first optical coupler is coupled to a second end, opposite to the first end, of the first multi-mode waveguide.

7. The optical device of claim 6, wherein:
the first multi-mode waveguide has a first width;
the second single-mode waveguide has a fourth width smaller than the first width; and
a width of the third optical coupler tapers from the fourth width to the first width.

8. The optical device of claim 1, wherein the first multi-mode waveguide, the first single-mode waveguide, and the first optical coupler are formed in a same planar layer of a material on a substrate.

9. The optical device of claim 1, wherein:
the first multi-mode waveguide and the first optical coupler spiral inward toward a center region of the optical device.

10. The optical device of claim 1, wherein:
the first plurality of spiral rounds includes a first outmost spiral portion having a first radius of curvature and a first inmost spiral portion having a second radius of curvature smaller than the first radius of curvature, and spiral portions between the first outmost spiral portion and the first inmost spiral portion and having successively decreasing radii from the first radius of curvature to the second radius of curvature; and
the first optical coupler includes a second plurality of spiral rounds, the second plurality of spiral rounds including a second outmost spiral portion having a third radius of curvature and a second inmost spiral portion having a fourth radius of curvature smaller than the third radius of curvature, and spiral portions between the second outmost spiral portion and the second inmost spiral portion and having successively decreasing radii from the third radius of curvature to the fourth radius of curvature.

11. The optical device of claim 10, wherein the first single-mode waveguide includes a curved portion having a radius of curvature smaller than each of the fourth radius of curvature.

12. A method, comprising:
receiving light;
propagating the light in a first multi-mode waveguide toward a first optical coupler wherein the first multi-mode waveguide includes a first plurality of spiral rounds;
propagating the light in the first optical coupler toward a first single-mode waveguide, the first optical coupler being tapered and curved; and
propagating the light along the first single-mode waveguide, wherein a first portion of the first single-mode waveguide has a first single-mode radius of curvature having a first center, a second portion of the first single-mode waveguide has a second single-mode radius of curvature having a second center, and at least a portion of the first single-mode waveguide is located between the first center and the second center.

13. The method of claim 12, wherein:
the first plurality of spiral rounds includes a first outmost spiral portion having a first radius of curvature and a first inmost spiral portion having a second radius of curvature smaller than the first radius of curvature, and spiral portions between the first outmost spiral portion and the first inmost spiral portion and having successively decreasing radii from the first radius of curvature to the second radius of curvature; and
the first optical coupler includes a second plurality of spiral rounds, the second plurality of spiral rounds including a second outmost spiral portion having a third radius of curvature and a second inmost spiral portion having a fourth radius of curvature smaller than the third radius of curvature, and spiral portions between the second outmost spiral portion and the second inmost spiral portion and having successively decreasing radii from the third radius of curvature to the fourth radius of curvature.

14. The method of claim 13, wherein the first single-mode waveguide includes a curved portion having a radius of curvature smaller than the fourth radius of curvature.

15. The method of claim 12, wherein:
the first multi-mode waveguide has a first width;
the first single-mode waveguide has a second width smaller than the first width; and
a width of the first optical coupler tapers from the first width to the second width.

16. The method of claim 15, further comprising:
propagating the light from the first single-mode waveguide toward a second optical coupler coupled with a second end of the first single-mode waveguide opposite to a first end of the first single-mode waveguide coupled to the first optical coupler, the second optical coupler being tapered and curved;

propagating the light in the second optical coupler toward a second multi-mode waveguide distinct and separate from the first multi-mode waveguide; and propagating the light along the second multi-mode waveguide.

17. The method of claim 16, wherein:

the second multi-mode waveguide has a third width greater than the second width; and a width of the second optical coupler tapers from the second width to the third width.

18. The optical device of claim 4, wherein:

the first plurality of spiral rounds spirals toward the first optical coupler in a direction that is one of: a clockwise direction or a counterclockwise direction; and the second multi-mode waveguide includes a second plurality of spiral rounds that spirals away from the second optical coupler in a direction that is the other of: the clockwise direction or the counterclockwise direction.

19. An optical device, comprising:

a first multi-mode waveguide, wherein the first multi-mode waveguide includes a first plurality of spiral rounds;

a first optical coupler coupled to the first multi-mode waveguide, the first optical coupler being tapered and curved; and a first single-mode waveguide having a first end coupled to the first optical coupler, wherein a first portion of the first single-mode waveguide curves in a direction that is one of a clockwise direction and a counterclockwise direction and a second portion of the first single-mode waveguide curves in a direction that is the other of the clockwise direction and the counterclockwise direction.

* * * * *